US007085503B2

(12) United States Patent
Mokuya

(10) Patent No.: US 7,085,503 B2
(45) Date of Patent: Aug. 1, 2006

(54) DEVICE MANAGEMENT SYSTEM, PRINTER MANAGEMENT SYSTEM, PRINTER MANAGEMENT TERMINAL, NETWORK PRINTER, PROGRAM FOR TERMINAL AND PROGRAM FOR PRINTER, AND DEVICE MANAGEMENT METHOD

(75) Inventor: Senichi Mokuya, Suwa (JP)

(73) Assignee: Seiko Epson Corporation (JP)

( * ) Notice: Subject to any disclaimer, the term of this patent is extended or adjusted under 35 U.S.C. 154(b) by 232 days.

(21) Appl. No.: 10/720,733

(22) Filed: Nov. 24, 2003

(65) Prior Publication Data

US 2004/0158661 A1    Aug. 12, 2004

(30) Foreign Application Priority Data

Dec. 11, 2002    (JP)    ............................. 2002-359766

(51) Int. Cl.
*G03G 15/00*    (2006.01)

(52) U.S. Cl. .............................. 399/8; 399/24; 399/27

(58) Field of Classification Search ..................... None
See application file for complete search history.

(56) References Cited

U.S. PATENT DOCUMENTS

| | | | |
|---|---|---|---|
| 5,349,377 A | | 9/1994 | Gilliland et al. |
| 5,383,129 A | * | 1/1995 | Farrell ........................ 705/400 |
| 5,636,032 A | * | 6/1997 | Springett ..................... 358/296 |
| 5,850,584 A | * | 12/1998 | Robinson et al. ............. 399/79 |
| 6,052,547 A | * | 4/2000 | Cuzzo et al. .................. 399/79 |
| 6,275,664 B1 | | 8/2001 | Wolf et al. |
| 6,516,157 B1 | * | 2/2003 | Maruta et al. ................... 399/8 |
| 6,574,443 B1 | * | 6/2003 | Butikofer et al. ............. 399/79 |
| 6,801,731 B1 | * | 10/2004 | Parker .......................... 399/79 |
| 2002/0018681 A1 | | 2/2002 | Kageyama |

FOREIGN PATENT DOCUMENTS

| | | |
|---|---|---|
| JP | 08-166712 | 6/1996 |
| JP | 8-234555 | 9/1996 |
| JP | 08-234555 | 9/1996 |
| JP | 9-022227 | 1/1997 |
| JP | 10-181044 | 7/1998 |

(Continued)

OTHER PUBLICATIONS

Communication from corresponding Japanese Patent Office re: counterpart application.

(Continued)

*Primary Examiner*—Robert Beatty
(74) *Attorney, Agent, or Firm*—Harness, Dickey & Pierce, P.L.C.

(57) ABSTRACT

There is provided a device management system suitable for accurately calculating an average consumption quantity of toner and the like per print sheet and thereby accurately calculating a printing cost depending on use environments. A network printer 200 detects a remaining quantity of toner and the like, a total number of printed sheets and a total number of activations, and send status information including the detection results to a printer management server 100. When receiving the status information, the printer management server 100 registers the received status information with a status information registration table 400, and calculates an average consumption quantity by calculating the total consumption quantity of toner and the like, the total number of printed sheets and the total number of activations within an appointed period based on the status information registration table 400, multiplying the total number of activations by the consumption-quantity-during-activation calculation coefficient $k_1$ and dividing the multiplication result added to the total consumption quantity of toner and the like by the total number of printed sheets.

17 Claims, 11 Drawing Sheets

FOREIGN PATENT DOCUMENTS

| | | |
|---|---|---|
| JP | 10-181045 | 7/1998 |
| JP | 10-181046 | 7/1998 |
| JP | 2000-071581 | 3/2000 |
| JP | 2001-228761 | 8/2001 |
| JP | 2002-067451 | 3/2002 |

OTHER PUBLICATIONS

Communication (with translation) from Chinese Patent Office re: related application.

* cited by examiner

FIG. 3

400 STATUS INFORMATION REGISTRATION TABLE

| CREATION DATE 410 | PRINTER ID 412 | IP ADDRESS 414 | SUBNET MASK 416 | REMAINING QUANTITY OF TONER/INK 418 | TOTAL NUMBER OF PRINTED SHEETS 420 | NUMBER OF ACTIVATIONS 422 | DATA QUANTITY 424 |
|---|---|---|---|---|---|---|---|
| 2002/11/14 | 001 | 192.168.1.10 | 255.255.255.0 | 20% | 21000 | 4 | 13500 |
| 2002/11/14 | 002 | 192.168.2.10 | 255.255.255.0 | 30% | 15900 | 3 | 4500 |
| 2002/11/14 | 003 | 192.168.3.10 | 255.255.255.0 | 40% | 10800 | 2 | 33400 |
| 2002/11/25 | 001 | 192.168.1.10 | 255.255.255.0 | 15% | 21050 | 5 | 26800 |

FIG. 4

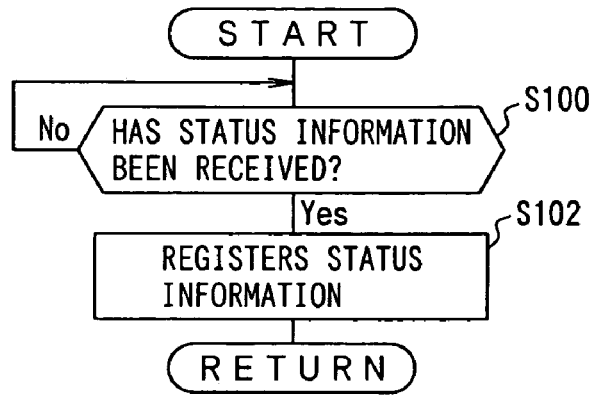

FIG. 5

| EXAMPLE | DESCRIPTION |
|---|---|
| 00AABBCCDDEE | \<PRINTER ID\> |
| 2002/10/22 | |
| 96 | \<%:REMAINING QUANTITY OF CONSUMABLES  CYAN\> |
| 47 | \<%:REMAINING QUANTITY OF CONSUMABLES  MAGENTA\> |
| 58 | \<%:REMAINING QUANTITY OF CONSUMABLES  YELLOW\> |
| 86 | \<%:REMAINING QUANTITY OF CONSUMABLES  BLACK\> |
| 150 | \<SHEETS:TOTAL NUMBER OF PRINTED SHEETS\> |
| 4 | \<TIMES:TOTAL NUMBER OF ACTIVATIONS\> |
| 13500 | \<PRINTED NUMBER OF BITS  CYAN\> |
| 4500 | \<PRINTED NUMBER OF BITS  MAGENTA\> |
| 33400 | \<PRINTED NUMBER OF BITS  YELLOW\> |
| 26800 | \<PRINTED NUMBER OF BITS  BLACK\> |

FIG. 19

SCREEN EXAMPLE

|  | CURRENT VALUE | VALUE AFTER CHANGE |
|---|---|---|
| AVERAGE NUMBER OF PRINTED SHEETS PER DAY | 200 | 400 |
| AVERAGE NUMBER OF POWER SOURCE OPERATIONS PER DAY | 4 | 2 |
| AVERAGE PRINTED DATA QUANTITY PER ONE TIME | CYAN:46000<br>MAGENTA:23000<br>YELLOW:78000<br>BLACK:54000 | 20000<br>10000<br>50000<br>30000 |

← VALUES TO BE INPUTTED BY USER

|  | SET VALUE | VALUE AFTER CHANGE |
|---|---|---|
| TONER PRICE(COLOR) | ¥20000 | ¥18000 |
| TONER PRICE(BLACK) | ¥18000 | ¥17000 |

[ CALCULATION OF COST ] ← RESULT IS DISPLAYED AT THE LOWER PART BY PRESSING CALCULATION BUTTON AFTER INPUT

CALCULATION RESULT

|  | CURRENT VALUE | CALCULATED VALUE |
|---|---|---|
| COST ONLY OF PRINTING | ¥2.59/SHEET | ¥2.23/SHEET |
| RUNNING COST | ¥2.89/SHEET | ¥2.56/SHEET |

DEVICE MANAGEMENT SYSTEM, PRINTER MANAGEMENT SYSTEM, PRINTER MANAGEMENT TERMINAL, NETWORK PRINTER, PROGRAM FOR TERMINAL AND PROGRAM FOR PRINTER, AND DEVICE MANAGEMENT METHOD

BACKGROUND OF THE INVENTION

1. Field of the Invention

The present invention relates to a system for managing a consumption quantity of consumables used for printing by a printer, a terminal, a printer, a program and a method, and in particular to a device management system, a printer management system, a printer management terminal, a network printer, a program for a terminal and a program for a printer, and a device management method, suitable for accurately calculating an average consumption quantity of toner and the like per print sheet and thereby accurately calculating a printing cost depending on use environments.

2. Description of the Prior Art

When installing a printer in an office, it is desired to install a printer with running cost as low as possible from a viewpoint of cost reduction. As an example of a running cost, a cost equivalent to an average consumption quantity of toner/ink per print sheet (hereinafter simply referred to as a printing cost) is known as an index, and it is the only way to obtain the index to adopt a value announced by a printer manufacturer at present. However, the printing cost announced by a printer manufacturer is a value obtained when a printing sample appointed by the printer manufacturer is printed. Therefore, it is not necessarily applicable to an actual situation because the printing cost varies according to printed contents.

Accordingly, a technique for managing a printer according to use environments can be used. Prior-art techniques for managing a printer and related techniques include, for example, an image forming device disclosed in Patent Document 1 (hereinafter referred to as a first prior-art example), a print information processing method for a page printer, disclosed in Patent Document 2 (hereinafter referred to as a second prior-art example), a printing system disclosed in Patent Document 3 (hereinafter referred to as a third prior-art example), and a consumables management system disclosed in Patent Document 4 (hereinafter referred to as a fourth prior-art example).

In the first prior-art example, it is determined whether or not there is developer with an antenna electrode plate by utilizing change in electrostatic capacity based on the quantity of toner between a development sleeve and the antenna electrode; the number of recording material sheets received and outputted within a predetermined time is detected; an equation of $W=f(V)$, which indicates relation between a toner capacity W and a remaining toner detection output voltage V, is stored in advance; the number of days for which the remaining toner can be used is estimated based on the initial toner capacity, the toner capacity after N sheets have been received and outputted, the quantity of toner from which it is determined that there is no toner, and an average toner consumption quantity per sheet when N sheets are received and outputted with the remaining toner output voltage. Furthermore, the number of days, for which the remaining sheets can be used, is estimated based on the number of the remaining sheets detected by a remaining sheet quantity detecting portion and the above-mentioned number of received and outputted sheets. Here, an average toner consumption quantity per sheet when received N sheets are outputted is calculated by $(W_i-\omega))/N=(W_i-f(\upsilon))/N$ based on $\omega=f(\upsilon)$, where the initial toner capacity is indicated by $W_i$, the toner capacity after received N sheets are outputted is indicated by $\omega$, and the remaining toner detection output voltage is indicated by $\upsilon$. This enables a user to be accurately informed of the time for replenishing toner and sheets.

In the second prior-art example, there are executed steps of: calculating the black pixel ratio for each page of print data in a page memory to update the number of printed sheets and the printing ratio, and accumulatingly storing them in a statistic memory; determining the current time, updating the average number of printed sheets and printing ratio per day based on the number of printed sheets and printing ratio for the day stored in the statistic memory to store them in the statistical memory at the end of the day, and updating the average number of printed sheets and printing ratio per month based on the average number of printed sheets and printing ratio per day stored in the statistical memory to store them in the statistical memory at the end of the month; and displaying the average number of printed sheets and printing ratio per month, per day and the number of printed sheets and printing ratio for the day. This makes it possible to accumulatingly update the number of printed sheets and the black pixel ratio of the printed sheets after exchange of a unit to use them as statistic data, and thereby the time for exchanging the unit can be accurately predicted.

The third prior-art example, there are provided a printer including a printer control portion, consumables, a storage portion and a network communication portion and accumulating printing history information in the storage portion for each data printing, and a host computer which is connected to the printer and provided with a network communication portion, a date management portion for dates to exchange consumables and the like, a portion for reading the printing history information, a portion for predicting the time for exchanging consumables based on the printing history information read from the printer, and a display portion for displaying the predicted result for each of the consumables. The interval for monitoring printing information accumulated in the printer can be changed from the host computer. Thus, it is possible to efficiently and accurately predict life of parts to be exchanged and consumables and notify it to a user even in the case of utilization on a network.

In the fourth prior-art example, when a toner low signal is sent from a user's equipment to a service center, the service center predicts the time when the toner is run down, based on the type of the cartridge and the time when the toner low signal was generated. The result of the prediction is notified to the user, and cartridge delivery/recovery is performed by a delivery company at the date and time agreed with by the user. Thus, as for toner provided in a cartridge, it is possible to accurately predict the time when the toner is run down and recommend exchange thereof.

(Patent Document 1)
 Published Unexamined Patent Application No. 8-234555

(Patent Document 2)
 Published Unexamined Patent Application No. 9-22227

(Patent Document 3)
 Published Unexamined Patent Application No. 2000-71581

(Patent Document 4)
 Published Unexamined Patent Application No. 2001-228761

As described above, in the first prior-art example, an average toner consumption quantity per sheet when received N sheets are outputted is calculated based on an initial toner capacity Wi, a toner capacity ω after received N sheets are outputted and a remaining toner detection output voltage υ. However, a printer performs warm-up operation, cleaning operation and the like when it is powered on and activated, and toner or ink (hereinafter referred to as toner and the like) is consumed during the operation although only slightly. Therefore, if activation is repeated, the average toner consumption quantity per sheet when received N sheets are outputted cannot be accurately calculated from the above arithmetic expression.

In the second prior-art example, only an average number of printed sheets and printing ratio per month and per day, and the number of printed sheet and printing ratio for the day are calculated and displayed, and the average toner consumption quantity per print sheet cannot be accurately calculated.

In the third prior-art example, the time for exchanging toner and the like of a printer is predicted by comparing the number of actually printed sheets and a predetermined value for a consumption degree of toner and the like of a printer. In the fourth prior-art example, remaining quantity alert information is obtained, which indicates that the remaining quantity of toner and the like has reached a predetermined amount, and the date when the toner and the like is run down is predicted based on the obtained remaining quantity alert information. In these cases, however, the average consumption quantity of toner and the like per print sheet cannot be accurately calculated because consumption of toner and the like during activation is not taken into consideration.

Accordingly, the first to fourth prior-art examples have a problem that it is difficult to accurately calculate a printing cost depending on use environments.

Furthermore, in printers used at present, the value of the remaining quantity of toner and the like, which can be obtained from a printer, is not necessarily accurate. For example, the detection accuracy is in increments of 2%. Therefore, it is not possible to accurately calculate an average consumption quantity of toner and the like per print sheet. Thus, there is a problem that it is difficult to accurately calculate a printing cost depending on use environments.

This problem is not limited to a printer but can be assumed for any device the operation of which consumes consumables.

Accordingly, the present invention has been made in consideration of the unsolved problem of the prior-art techniques. The object of the invention is to provide a device management system, a printer management system, a printer management terminal, a network printer, a program for a terminal and a program for a printer, and a device management method, suitable for accurately calculating an average consumption quantity of toner and the like per print sheet and thereby accurately calculating a printing cost depending on use environments.

SUMMARY OF THE INVENTION (Invention 1)

To achieve the above object, a device management system according to an invention 1 is a device management system for managing the quantity of consumables consumed by operation of a device; the system comprising:

utilization degree obtaining section for obtaining a utilization degree indicating a degree of utilization of the consumables; generation quantity obtaining section for obtaining the quantity of a product generated by consumption of the consumables; section for counting the number of activations for counting the number of activations of the device; and consumption ratio calculating section for calculating the ratio of the consumption quantity to the generation quantity based on the utilization degree obtained by the utilization degree obtaining section, the generation quantity obtained by the generation quantity obtaining section and the number of activations counted by the section for counting the number of activations.

In such a configuration, a utilization degree can be obtained by the utilization degree obtaining section; the quantity of a generated product can be obtained by the generation quantity obtaining section; and the number of activations of a device can be counted by the section for counting the number of activations. The ratio of a consumption quantity to the generation quantity is calculated by the consumption ratio calculating section based on the obtained utilization degree and generation quantity and the counted number of activations. When the device is activated, consumption of a certain amount of consumables is taken into consideration, so that the ratio of a consumption quantity to a generation quantity can be more accurately calculated, by taking into consideration the number of activations of the device, in comparison with the case where the consumption is not taken into consideration.

Thus, since the number of activations of the device is taken into consideration in calculation of the ratio of a consumption quantity to a generation quantity, the ratio of a consumption quantity to a generation quantity can be relatively accurately calculated. Therefore, in comparison with the prior-art techniques, an effect is obtained that a printing cost and other running costs depending on use environments can be relatively accurately calculated.

The utilization degree here means such that indicates a degree of utilization of consumables to be consumed by operation of a device, and includes a utilization quantity of consumables, a utilization rate, utilization frequency and other items indicating a degree of utilization. The utilization quantity of consumables includes not only the consumption quantity but also the remaining quantity. The same is true for a device management method according to an invention 23 described below.

The utilization degree obtaining section may be in any configuration only if it can obtain a utilization degree, and may be configured to calculate, detect or estimate a utilization degree. Alternatively, it may be configured to obtain a utilization degree from the device or other terminals. The same is true for the case where a generation quantity can be obtained by the generation quantity obtaining section.

This system may consist of only a device, or it may be configured as a network system in which a device is communicatively connected to a terminal or other equipment. In the latter case, each component may belong to either of the device and the equipment only if it is communicatively connected. The same is true for a device management system according to an invention 2 described below.

(Invention 2)

Furthermore, a device management system according to an invention 2 is a device management system for managing the quantity of consumables consumed by operation of a device;

the device generating a product generated by consumption of the consumables, based on given data to be generated; and the device management system comprising: generation quantity obtaining section for obtaining the quantity of the product; data quantity obtaining section for obtaining the quantity of generated data; and consumption ratio calculating section for calculating the ratio of the consumption quantity to the generation quantity based on the generation quantity obtained by the generation quantity obtaining section and the data quantity obtained by the data quantity obtaining section.

In such a configuration, the quantity of a generated product can be obtained by the generation quantity obtaining section, and the quantity of generated data can be obtained by the data quantity obtaining section. The ratio of the consumption quantity to the generation quantity is then calculated by the consumption ratio calculating section based on the obtained generation quantity and data quantity.

When accuracy of detecting a consumption quantity of consumables is not high, an accurate value cannot be obtained by calculating the ratio of a consumption quantity to a generation quantity based on a detected consumption quantity. In such a case, it may be more accurate to estimate a consumption quantity from a data quantity than to use an actually measured value. This is because a consumption quantity is not very proportional to a generation quantity of a product but is proportional or almost proportional to a data quantity. Accordingly, by taking a data quantity into consideration, the ratio of a consumption quantity to a generation quantity can be relatively accurately calculated even when accuracy of detecting a consumption quantity is not high.

Thus, since a data quantity is taken into consideration in calculation of the ratio of a consumption quantity to a generation quantity, the ratio of a consumption quantity to a generation quantity can be relatively accurately calculated. Therefore, in comparison with the prior-art techniques, an effect is obtained that a printing cost and other running costs depending on use environments can be relatively accurately calculated even when accuracy of detecting the consumption quantity is not high.

The generation quantity obtaining section here may be in any configuration only if it can obtain a generation quantity, and may be configured to calculate, detect or estimate a quantity to be generated. Alternatively, it may be configured to obtain the generation quantity from the device or other terminals. The same is true for the case where a data quantity can be obtained by the data quantity obtaining section.

(Invention 3)

In order to achieve the above object, a printer management system according to an invention 3 is a printer management system for communicatively connecting a network printer and a printer management terminal for managing the network printer and for managing a consumption quantity of consumables used for printing by the network printer;

the network printer comprising: utilization quantity detecting section for detecting a utilization quantity of the consumables; section for detecting the number of printed sheets for detecting the number of sheets of printed matter printed by the network printer; section for counting the number of activations for counting the number of activations of the network printer; and status information sending section for sending status information including the utilization quantity detected by the utilization quantity detecting section, the number of printed sheets detected by the section for detecting the number of printed sheets and the number of activations counted by the section for counting the number of activations, to the printer management terminal; and the printer management terminal comprising: status information receiving section for receiving the status information; and consumption ratio calculating section for calculating the ratio of the consumption quantity to the number of printed sheets based on the status information received by the status information receiving section.

In such a configuration, in the network printer, the utilization quantity of consumables is detected by the utilization quantity detecting section; the number of printed sheets of a printed matter is detected by the section for detecting the number of printed sheets, and the number of activations of the network printer is counted by the section for counting the number of activations. Status information including the detected utilization quantity and the number of printed sheets, and the counted number of activations is then sent to the printer management terminal by the status information sending section.

At the printer management terminal, when the status information is received by the status information receiving section, the ratio of a consumption quantity to the number of printed sheets is calculated by the consumption ratio calculating section based on the received status information. When the network printer is activated, consumption of a certain amount of consumables is taken into consideration, so that the ratio of a consumption quantity to a generation quantity can be more accurately calculated, by taking into consideration the number of activations of the network printer, in comparison with the case where the consumption is not taken into consideration.

Thus, since the number of activations of the network printer is taken into consideration in calculation of the ratio of a consumption quantity to the number of printed sheets, the ratio of a consumption quantity to the number of printed sheets can be relatively accurately calculated. Therefore, in comparison with the prior-art techniques, an effect is obtained that a printing cost depending on use environments can be relatively accurately calculated.

The utilization quantity here means the quantity of consumables used for printing by the network printer, and includes not only the consumption quantity but also the remaining quantity. The same is true for a printer management terminal according to an invention 15 and a program for a terminal, according to an invention 19 described below.

The printer management terminal may be any communication equipment connected to one end of a channel to a network printer only if it has at least a server function, and maybe configured to have both of a client function and a server function. The same is true for a printer management system according to an invention 13, a printer management terminal according to inventions 15 and 16, and a program for a terminal, according to inventions 19 and 20.

(Invention 4)

Furthermore, a printer management system according to an invention 4 is the printer management system according to the invention 3, wherein the printer management terminal further comprises status information storing section for storing the status information;

the status information receiving section receives the status information and stores the received status information in the status information storing section; and the consumption ratio calculating section calculates an average consumption quantity per print sheet by specifying the total consumption quantity of the consumables from a predetermined reference point of time based on the utilization quantity included in the status information in the status information storing section, specifying the total number of printed sheets from the predetermined reference point of time based on the total number of printed sheets included in the status information in the status information storing section, specifying the total number of activations from the predetermined reference point of time based on the number of activations included in the status information in the status information storing section, multiplying the total number of activations by a predetermined value, and dividing the multiplication result added to the total consumption quantity by the total number of printed sheets.

In such a configuration, in the printer management terminal, the status information received by the status information receiving section is stored in the status information storing section. The total consumption quantity of consumables from a predetermined reference point of time is then specified by the consumption ratio calculating section based on the utilization quantity included in the status information in the status information storing section. The total number of printed sheets from the predetermined reference point of time is specified based on the number of printed sheets included in the status information in the status information storing section. The total number of activations from the predetermined reference point of time is specified based on the number of activations included in the status information in the status information storing section. Then, the total number of activations is multiplied by the predetermined value, and the multiplication result added to the total consumption quantity is divided by the total number of printed sheets to calculate an average consumption quantity per print sheet.

Thus, an average consumption quantity per print sheet can be relatively accurately calculated. Accordingly, since a printing cost can be calculated only by dividing a consumption cost per unit of consumables by the obtained average consumption quantity, an effect is also obtained that a printing cost depending on use environments can be more accurately calculated.

The status information storing section here is such that stores status information through any section and at any time. The status information storing section may be such that stores status information in advance, or it maybe configured to store status information in response to an external input when the system is operating, without storing the status information in advance. The same is true for a printer management system according to an invention 14 described below.

(Invention 5)

A printer management system according to an invention 5 is the printer management system according to the invention 4, wherein the printer management terminal further comprises predetermined value correcting section for specifying the total consumption quantity based on the utilization quantity included in the status information in the status information storing section and correct the predetermined value based on the specified total consumption quantity.

In such a configuration, in the printer management terminal, the total consumption quantity is specified by predetermined value correcting section based on the status information in the status information storing section, and the predetermined value is corrected based on the specified total consumption quantity. The quantity to be consumed during activation of a network printer differs according to network printers, and therefore, by correcting a magnification (predetermined value) based on an actually measured value, the quantity to be consumed during activation can be relatively accurately calculated.

Accordingly, an average consumption quantity per print sheet can be relatively accurately calculated, and therefore an effect is obtained that a printing cost depending on use environments can be more accurately calculated.

(Invention 6)

Furthermore, a printer management system according to an invention 6 is the printer management system according to any of the inventions 4 and 5, wherein the network printer further comprises printing section for performing printing based on received data to be printed and printed data quantity detecting section for detecting the quantity of printed data;

the status information sending section sends the status information including the utilization quantity detected by the utilization quantity detecting section, the number of printed sheets detected by the section for detecting the number of printed sheets, the number of activations counted by the section for counting the number of activations and the data quantity detected by the printed data quantity detecting section, to the printer management terminal; and the consumption ratio calculating section compares the newest status information and status information immediately preceding the newest status information and, if it is determined that there is change in the data quantity but no change in the utilization quantity, calculates an average consumption quantity per print sheet by specifying an total data quantity from the predetermined reference point of time based on the data quantity included in the status information in the status information storing section, estimating the total consumption quantity from a predetermined arithmetic expression based on the specified total data quantity, dividing the multiplication result added to the total consumption quantity by the total number of printed sheets.

In such a configuration, in the network printer, when data to be printed is received, printing is performed by the printing section based on the received data to be printed. The quantity of printed data is detected by the printed data quantity detecting section, and the status information including the utilization quantity, the number of printed sheets and the data quantity, which have been detected, and the counted number of activations is sent to the printer management terminal by the status information sending section.

In the printer management terminal, when the status information is received by the status information receiving section, the received status information is stored in the status information storing section. Then, the newest status information and status information immediately preceding the newest status information in the status information storing section are compared and, if it is determined that there is change in the data quantity but no change in the utilization quantity, then the total data quantity from a predetermined reference point of time is specified by the consumption ratio calculating section based on the data quantity included in the status information in the status information storing section. A total consumption quantity is estimated from a predetermined arithmetic expression based on the specified total data quantity. Then, the value obtained by adding the multiplication result to the total consumption quantity is divided by the total number of printed sheets to calculate an average consumption quantity per print sheet.

When accuracy of detecting a consumption quantity of consumables in a network printer is not high, an accurate value cannot be obtained by calculating an average consumption quantity per print sheet based on a detected consumption quantity. In such a case, it may be more accurate to estimate a consumption quantity from a data quantity than to use an actually measured value. This is because a consumption quantity is not very proportional to the number of printed sheets but is proportional or almost proportional to a data quantity. Accordingly, by taking a data quantity into consideration, an average consumption quantity per print sheet can be relatively accurately calculated even when accuracy of detecting a consumption quantity is not high.

Thus, since a data quantity is taken into consideration in calculation of an average consumption quantity per print sheet, the average consumption quantity per print sheet can be relatively accurately calculated. Therefore, an effect is also obtained that a printing cost depending on use environments can be relatively accurately calculated even when accuracy of detecting a consumption quantity is not high.

(Invention 7)

Furthermore, a printer management system according to an invention 7 is the printer management system according to the invention 6; wherein the predetermined arithmetic expression is for multiplying the total data quantity by a predetermined coefficient and adding a predetermined constant to the multiplication result.

In such a configuration, in the printer management terminal, the total data quantity is multiplied by a predetermined coefficient by the consumption ratio calculating section, and a predetermined constant is added to the multiplication result to estimate a total consumption quantity. The total consumption quantity can be relatively accurately estimated because of the fact that consumption quantity is proportional or almost proportional to a data quantity.

Thus, an average consumption quantity per print sheet can be more accurately calculated, so that an effect is also obtained that a printing cost depending on use environments can be more accurately calculated even when accuracy of detecting a consumption quantity is not high.

(Invention 8)

Furthermore, a printer management system according to an invention 8 is the printer management system according to the invention 7, wherein the printer management terminal further comprises arithmetic expression correcting section for specifying the total consumption quantity based on the utilization quantity included in the status information in the status information storing section to correct the predetermined coefficient and the predetermined constant based on the specified total consumption quantity.

In such a configuration, in the printer management terminal, a total consumption quantity is specified by the arithmetic expression correcting section based on the utilization quantity included in the status information in the status information storing section, and the predetermined coefficient and the predetermined constant are corrected based on the specified total consumption quantity. Though a consumption quantity is proportional or almost proportional to a data quantity, the degree of the proportion differs according to network printers. Therefore, by correcting the degree of proportion (a predetermined coefficient and a predetermined constant) based on an actually measured value, the consumption quantity can be relatively accurately estimated.

Thus, an average consumption quantity per print sheet can be more accurately calculated, so that an effect is also obtained that a printing cost depending on use environments can be more accurately calculated.

(Invention 9)

Furthermore, a printer management system according to an invention 9 is the printer management system according to any of the inventions 6 to 8, wherein the consumption ratio calculating section compares the newest status information and status information immediately preceding the newest status information and, if it is determined that there is change in the data quantity but no change in the utilization quantity, calculates an average consumption quantity per print sheet by specifying the total data quantity within a predetermined period based on the data quantity included in the status information in the status information storing section, estimating the total consumption quantity of the consumables within the predetermined period from the predetermined arithmetic expression, based on the specified total data quantity, specifying the total number of printed sheets within the predetermined period based on the number of printed sheets included in the status information in the status information storing section, specifying the total number of activations within the predetermined period based on the number of activations included in the status information in the status information storing section, multiplying the total number of activations by a predetermined value, and dividing the multiplication result added to the total consumption quantity by the total number of printed sheets.

In such a configuration, in the printer management terminal, the newest status information and status information immediately preceding the newest status information it in the status information storing section are compared and, if it is determined that there is change in the data quantity but no change in the utilization quantity, the total data quantity within a predetermined period is specified based on the data quantity included in the status information in the status information storing section, and the total consumption quantity within the predetermined period is estimated from the predetermined arithmetic expression based on the specified total data quantity, by the consumption ratio calculating section. The total number of printed sheets within the predetermined period is then specified based on the number of printed sheets included in the status information in the status information storing section, and the total number of activations within the predetermined period is specified based on the number of activations included in the status information in the status information storing section. Then, the total number of activations is multiplied by the predetermined value, and the multiplication result added to the total consumption quantity is divided by the total number of printed sheets to calculate an average consumption quantity per print sheet.

Thus, an effect is also obtained that the average consumption quantity per print sheet within a predetermined period can be calculated.

(Invention 10)

Furthermore, a printer management system according to an invention 10 is the printer management system according to the invention 9, wherein the predetermined period is any of the past one day, one week and one month.

In such a configuration, in the printer management terminal, an average consumption quantity per print sheet is calculated for any of the past one day, one week and one month.

Thus, an effect is also obtained that an average consumption quantity per print sheet can be calculated for any of the past one day, one week and one month.

(Invention 11)

Furthermore, a printer management system according to an invention 11 is the printer management system according to any of the inventions 3 to 10, wherein the printer management terminal further comprises running cost calculating section for calculating a running cost of the consumables based on the calculation result of the consumption ratio calculating section.

In such a configuration, in the printer management terminal, a running cost of consumables is calculated by the running cost calculating section based on the calculation result of the consumption ratio calculating section.

Thus, since a running cost of consumables is calculated, an effect is also obtained that a printing cost depending on use environments can be relatively easily grasped.

(Invention 12)

Furthermore, a printer management system according to an invention 12 is the printer management system according to any of the inventions 3 to 11, wherein the printer management terminal further comprising second consumption ratio calculating section for calculating the ratio of the consumption quantity to the number of printed sheets based on the status information; and the second consumption ratio calculating section calculates an average consumption quantity per print sheet by specifying the total consumption quantity of the consumables from a predetermined reference point of time based on the utilization quantity included in the status information in the status information storing section, specifying the total number of printed sheets from the predetermined reference point of time based on the number of printed sheets included in the status information in the status information storing section, and dividing the total consumption quantity by the total number of printed sheets.

In such a configuration, in the printer management terminal, the total consumption quantity of consumables from a predetermined reference point of time is specified by the second consumption ratio calculating section based on the utilization quantity included in the status information in the status information storing section, and the total number of printed sheets from the predetermined reference point of time is specified based on the number of printed sheets included in the status information in the status information storing section. Then, the total consumption quantity is divided by the total number of printed sheets to calculate an average consumption quantity per print sheet.

Thus, an effect is also obtained that an average consumption quantity per print sheet can be calculated for each of the cases where a quantity consumed during activation is taken into consideration and where the quantity consumed during activation is not taken into consideration.

(Invention 13)

Furthermore, a printer management system according to an invention 13 is a printer management system for communicatively connecting a network printer and a printer management terminal for managing the network printer, and for managing a consumption quantity of consumables used for printing by the network printer;

the network printer comprising: printing section for performing printing based on received data to be printed; section for detecting the number of printed sheets for detecting the number of sheets of printed matter printed by the network printer; printed data quantity detecting section for detecting the quantity of printed data; and status information sending section for sending status information including the number of printed sheets detected by the section for detecting the number of printed sheets and the data quantity detected by the printed data quantity detecting section, to the printer management terminal; and the printer management terminal comprising: status information receiving section for receiving the status information; and consumption ratio calculating section for calculating the ratio of the consumption quantity to the number of printed sheets based on the status information received by the status information receiving section.

In such a configuration, in the printer management terminal, when data to be printed is received, printing is performed by the printing section based on the received data to be printed. Furthermore, the number of printed sheets of a printed matter is detected by the section for detecting the number of printed sheets, and the quantity of printed data is detected by the printed data quantity detecting section. Status information including the detected number of printed sheets and data quantity is then sent to the printer management terminal by the status information sending section.

In the printer management terminal, when the status information is received by the status information receiving section, the ratio of the consumption quantity to the number of printed sheets is calculated by the consumption ratio calculating section.

When accuracy of detecting a consumption quantity of consumables in a network printer is not high, an accurate value cannot be obtained by calculating the ratio of a consumption quantity to the number of printed sheets based on a detected consumption quantity. In such a case, it maybe more accurate to estimate a consumption quantity from a data quantity than to use an actually measured value. This is because a consumption quantity is not very proportional to the number of printed sheets but is proportional or almost proportional to a data quantity. Accordingly, by taking a data quantity into consideration, the ratio of a consumption quantity to the number of printed sheets can be relatively accurately calculated even when accuracy of detecting a consumption quantity is not high.

Thus, since a data quantity is taken into consideration in calculation of the ratio of a consumption quantity to the number of printed sheets, the ratio of a consumption quantity to the number of printed sheets can be relatively accurately calculated. Therefore, in comparison with the prior-art techniques, an effect is obtained that a printing cost depending on use environments can be relatively accurately calculated even when accuracy of detecting a consumption quantity is not high.

(Invention 14)

Furthermore, a printer management system according to an invention 14 is the printer management system according to the invention 13, wherein the printer management terminal further comprises status information storing section for storing the status information;

the status information receiving section receives the status information and stores the received status information in the status information storing section; and the consumption ratio calculating section calculates an average consumption quantity per print sheet by specifying the total data quantity from a predetermined reference point of time based on the data quantity included in the status information in the status information storing section, estimating the total consumption quantity of the consumables from the predetermined reference point of time from a predetermined arithmetic expression based on the specified total data quantity, specifying the total number of printed sheets from the predetermined reference point of time based on the number of printed sheets included in the status information in the status information storing section, and dividing the total consumption quantity by the total number of printed sheets.

In such a configuration, in the printer management terminal, the status information received by the status information receiving section is stored in the status information storing section. The total data quantity from a predetermined reference point of time is then specified by the consumption ratio calculating section based on the data quantity included in the status information in the status information storing section, and the total consumption quantity of consumables from the predetermined reference point of time is estimated from the predetermined arithmetic expression based on the specified total data quantity. Then, the total number of printed sheets from the predetermined reference point of time is specified based on the number of printed sheets included in the status information in the status information storing section, and the total consumption quantity is divided by the total number of printed sheets to calculate an average consumption quantity per print sheet.

Thus, an average consumption quantity per print sheet can be relatively accurately calculated. Accordingly, since a printing cost can be calculated only by dividing a consumption cost per unit of consumables by the obtained average consumption quantity, an effect is also obtained that a printing cost depending on use environments can be more accurately calculated.

(Invention 15)

In order to achieve the above object, a printer management terminal according to an invention 15 is a terminal communicatively connected to a network printer in the printer management system of the invention 3; the printer management terminal comprising:

status information receiving section for receiving status information including the utilization quantity, the number of printed sheets and the number of activations; and consumption ratio calculating section for calculating the ratio of the consumption quantity to the number of printed sheets based on the status information received by the status information receiving section.

In such a configuration, operation equivalent to that of the printer management terminal in the printer management system of the invention 3 can be obtained, and therefore, the effect equivalent to that of the printer management system of the invention 3 can be obtained.

(Invention 16)

Furthermore, a printer management terminal according to an invention 16 is a terminal communicatively connected to a network printer in the printer management system of the invention 13; the printer management terminal comprising:

status information receiving section for receiving status information including the number of printed sheets and the data quantity; and consumption ratio calculating section for calculating the ratio of the consumption quantity to the number of printed sheets based on the status information received by the status information receiving section.

In such a configuration, operation equivalent to that of the printer management terminal in the printer management system of the invention 13 can be obtained, and therefore, the effect equivalent to that of the printer management system of the invention 13 can be obtained.

(Invention 17)

In order to achieve the above object, a network printer according to an invention 17 is a printer communicatively connected to a printer management terminal in the printer management system of the invention 3; the network printer comprising:

utilization quantity detecting section for detecting a utilization quantity of the consumables; section for detecting the number of printed sheets for detecting the number of sheets of printed matter printed by the network printer; section for counting the number of activations for counting the number of activations of the network printer; and status information sending section for sending status information including the utilization quantity detected by the utilization quantity detecting section, the number of printed sheets detected by the section for detecting the number of printed sheets and the number of activations counted by the section for counting the number of activations, to the printer management terminal.

In such a configuration, operation equivalent to that of the network printer in the printer management system of the invention 3 can be obtained, and therefore, the effect equivalent to that of the printer management system of the invention 3 can be obtained.

(Invention 18)

Furthermore, a network printer according to an invention 18 is a printer communicatively connected to a printer management terminal in the printer management system of the invention 13; the network printer comprising:

printing section for performing printing based on received data to be printed; section for detecting the number of printed sheets for detecting the number of sheets of printed matter printed by the network printer; printed data quantity detecting section for detecting the quantity of printed data; and status information sending section for sending status information including the number of printed sheets detected by the section for detecting the number of printed sheets and the data quantity detected by the printed data quantity detecting section, to the printer management terminal.

In such a configuration, operation equivalent to that of the network printer in the printer management system of the invention 13 can be obtained, and therefore, the effect equivalent to that of the printer management system of the invention 13 can be obtained.

(Invention 19)

In order to achieve the above object, a program for terminal according to an invention 19 is a program for a terminal, to be executed by the printer management terminal of the invention 15, the printer management terminal consisting of a computer, and the program being for executing processing to be realized as:

status information receiving section for receiving status information including the utilization quantity, the number of printed sheets and the number of activations; and consumption ratio calculating section for calculating the ratio of the consumption quantity to the number of printed sheets based on the status information received by the status information receiving section.

In such a configuration, when a program is read by the printer management terminal and the printer management terminal executes processing in accordance with the read program, operation and an effect equivalent to those of the printer management terminal of the invention 15 can be obtained.

(Invention 20)

Furthermore, a program for a terminal according to an invention 20 is a program for a terminal, to be executed by the printer management terminal of the invention 16; the printer management terminal consisting of a computer, and the program being for executing processing to be realized as:

status information receiving section for receiving status information including the number of printed sheets and the data quantity; and consumption ratio calculating section for calculating the ratio of the consumption quantity to the number of printed sheets based on the status information received by the status information receiving section.

In such a configuration, when a program is read by the printer management terminal and the printer management terminal executes processing in accordance with the read program, operation and an effect equivalent to those of the printer management terminal of the invention 16 can be obtained.

(Invention 21)

In order to achieve the above object, a program for a printer according to an invention 21 is a program for a printer, to be executed by the network printer of the invention 17; the network printer consisting of a computer, and the program being for executing processing to be realized as:

utilization quantity detecting section for detecting a utilization quantity of the consumables; section for detecting the number of printed sheets for detecting the number of sheets of printed matter printed by the network printer; section for counting the number of activations for counting the number of activations of the network printer; and status information sending section for sending status information including the utilization quantity detected by the utilization quantity detecting section, the number of printed sheets detected by the section for detecting the number of printed sheets and the number of activations counted by the section for counting the number of activations, to the printer management terminal.

In such a configuration, when a program is read by the network printer and the network printer executes processing in accordance with the read program, operation and an effect equivalent to those of the printer management terminal according to the invention 17 can be obtained.

(Invention 22)

Furthermore, a program for a printer according to an invention 22 is a program for a printer, to be executed by the network printer of the invention 18; the network printer consisting of a computer, and the program being for executing processing to be realized as:

printing section for performing printing based on received data to be printed; section for detecting the number of printed sheets for detecting the number of sheets of printed matter printed by the network printer; printed data quantity detecting section for detecting the quantity of printed data; and status information sending section for sending status information including the number of printed sheets detected by the section for detecting the number of printed sheets and the data quantity detected by the printed data quantity detecting section, to the printer management terminal.

In such a configuration, when a program is read by the network printer and the network printer executes processing in accordance with the read program, operation and an effect equivalent to those of the printer management terminal according to the invention 18 can be obtained.

(Invention 23)

In order to achieve the above object, a device management method according to an invention 23 is a method for managing the quantity of consumables consumed by operation of a device, the method comprising:

a utilization degree obtaining step of obtaining a utilization degree indicating a degree of utilization of the consumables; a generation quantity obtaining step of obtaining the quantity of a product generated by consumption of the consumables; a step of counting the number of activations for counting the number of activations of the device; and a consumption ratio calculating step of calculating the ratio of the consumption quantity to the generation quantity based on the utilization degree obtained at the utilization degree obtaining step, the generation quantity obtained at the generation quantity obtaining step and the number of activations counted at the step of counting the number of activations.

An effect equivalent to that of the device management system of the invention 1 can be obtained.

The utilization degree obtaining step here may be any step only if it can obtain a utilization degree, and may be a step of calculating, detecting or estimating the utilization degree. Alternatively, it may be a step of obtaining the utilization degree from the device or other terminals. The same is true for the case where a generation quantity is obtained at the generation quantity obtaining step.

(Invention 24)

Furthermore, a device management method according to an invention 24 is a device management method for managing the quantity of consumables consumed by operation of a device, the device generating a product to be generated through consumption of the consumables based on given data to be generated; and the device management method comprising: a generation quantity obtaining step of obtaining the quantity of the product; a data quantity obtaining step of obtaining the quantity of generated data; and a consumption ratio calculating step of calculating the ratio of the consumption quantity to the generation quantity based on the generation quantity obtained at the generation quantity obtaining step and the data quantity obtained at the data quantity obtaining step.

An effect equivalent to that of the device management system of the invention 2 can be obtained.

The generation quantity obtaining step here may be any step only if it can obtain a generation quantity, and may be a step of calculating, detecting or estimating the generation quantity. Alternatively, it may be a step of obtaining the generation quantity from the device or other terminals. The same is true for the case where a data quantity can be obtained at the data quantity obtaining step.

BRIEF DESCRIPTION OF THE DRAWINGS

FIG. 3 shows a data structure of a status information registration table 400;

FIG. 4 is a flowchart showing a status information registration process;

FIG. 5 shows a data structure of status information;

FIG. 19 shows an input screen for changing parameters.

DETAILED DESCRIPTION OF THE PREFERRED EMBODIMENTS

An embodiment of the present invention is now described below with reference to the drawings. FIGS. 1 to 18 show an embodiment of a device management system, a printer management system, a printer management terminal, a network printer, a program for a terminal and a program for a printer, and a device management method according to the present invention.

Figure 1:
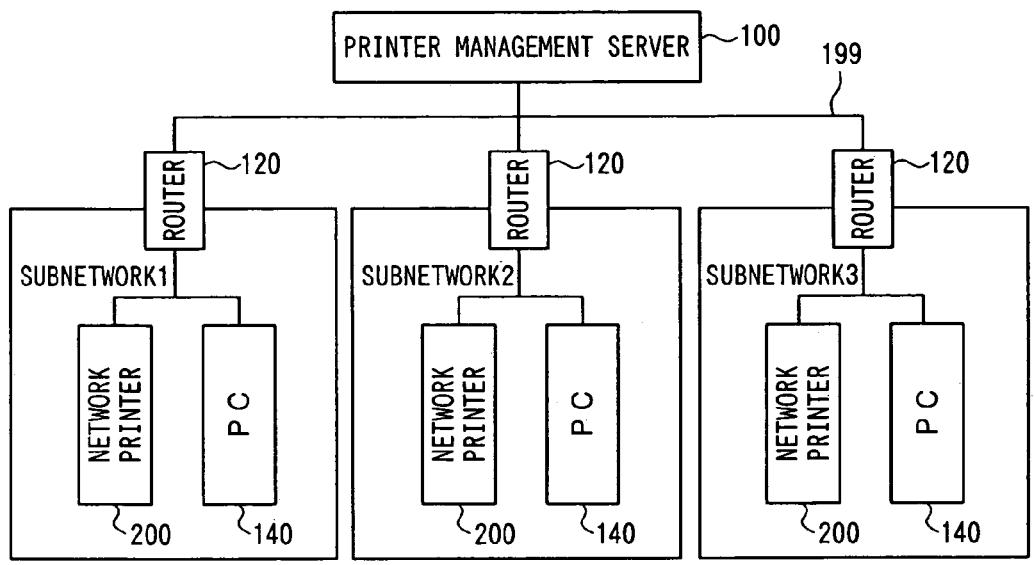
FIG. 1 is a block diagram showing a configuration of a network system to which the present invention is applied.

According to this embodiment, a device management system, a printer management system, a printer management terminal, a network printer, a program for a terminal and a program for a printer, and a device management method according to the present invention are applied to the case where a consumption quantity of consumables used for printing by network printers 200 is managed by a printer management server 100 as shown in FIG. 1.

A configuration of a network system to which the present invention is applied is now described with reference to FIG. 1.

FIG. 1 is a block diagram showing a configuration of a network system to which the present invention is applied.

A printer management server 100 for managing network printers 200 and multiple routers 120 are connected to the Internet 199 as shown in FIG. 1. A personal computer (hereinafter referred to as a PC) 140 and a network printer 200 for performing printing in response to a printing request by the PC 140 are connected to each of the routers 120. The PC 140 and the network printer 200 are connected to the Internet 199 via the router 120. The router 120, the PC 140 and the network printer 200 constitute one subnetwork. The subnetwork is such that is constructed for each department in a company, for example. Though only one PC 140 and one network printer 200 are shown in each subnetwork for facilitating understanding of the invention, a lot of PCs 140 and network printers 200 are connected actually.

A configuration of a printer management server 100 is now described in detail with reference to FIG. 2.

Figure 2:
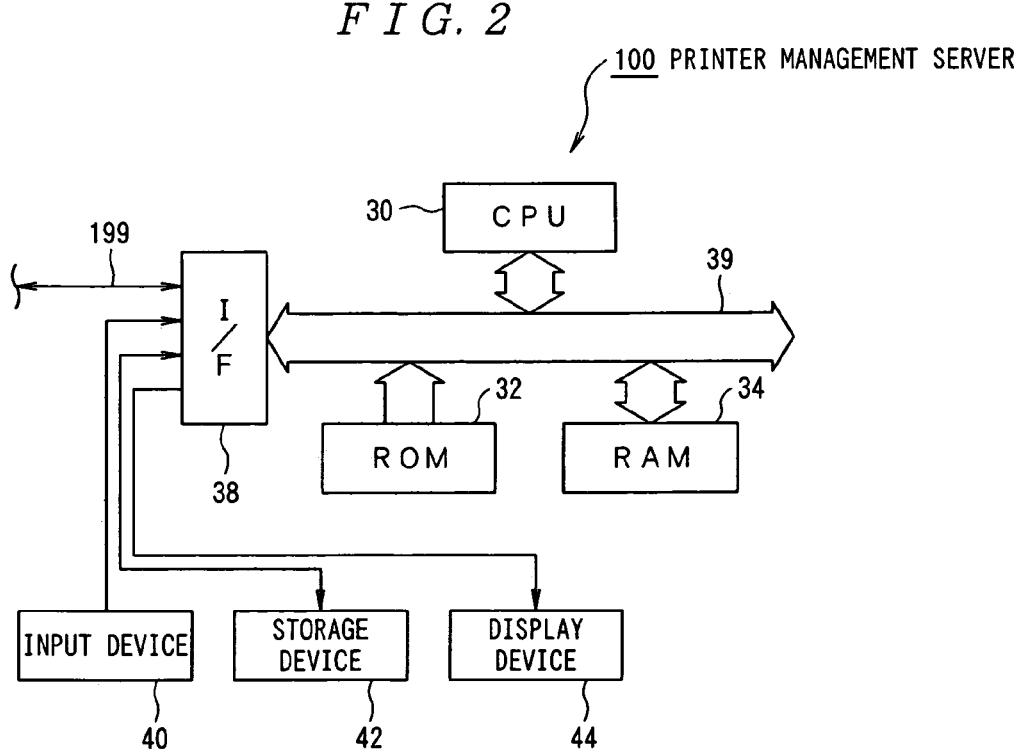
FIG. 2 is a block diagram showing a configuration of a printer management server 100.

FIG. 2 is a block diagram showing a configuration of a printer management server 100.

The printer management server 100 is composed of a CPU 30 controlling operation and the entire system based on a control program, a ROM 32 with the control program and the like of the CPU 30 stored in a predetermined area in advance, a RAM 34 for storing data read from the ROM 32 and the like and storing results of operations in an operation process of the CPU 30, and an I/F 38 for mediating input/output of data to/from an external device, as shown in FIG. 2. These are mutually connected via a bus 39, a signal line for transferring data in a manner that they can send and receive data one another.

An input device 40 comprising a keyboard, a mouse and the like which enable data input as a human interface, a storage device 42 for storing data, table and the like as a file, a display device 44 for displaying a screen based on an image signal, and a signal line for connecting to the Internet 199 are connected to the I/F 38 as external devices.

In the storage device 42, there is stored a status information registration table 400 with which status information indicating the status of the network printers 200 is to be registered, as shown in FIG. 3.

FIG. 3 shows a data structure of the status information registration table 400.

In the status information registration table 400, one record is registered for each status information. Each time status information is received from a network printer 200, a record is newly added. Each record is composed to include a field 410 where the date of creation of status information is registered, a field 412 where a printer ID for uniquely specifying a network printer 200 is registered, a field 414 where an IP address assigned to a network printer 200 is registered, a field 416 where a subnet mask assigned to a network printer is registered, a field 418 where a remaining quantity of toner and the like, which is used for printing by the network printer 200, is registered, a field 420 where a total number of sheets used for printing by the network printer 200 (hereinafter referred to as a total number of printed sheets) is registered, a field 422 where a total number of activations of the network printer 200 is registered, and a field 424 where a total quantity of printed data, which has been printed by the network printer 200, is registered.

In the example of FIG. 3, in the record on the first line, there are registered "2002/11/14" as the creation date, "001" as the printer ID, "192.168.1.10" as the IP address, "255.255.255.0" as the subnet mask, "20%" as the remaining quantity of toner and the like, "21000" as the total number of printed sheets, "4" as the number of activations, and "13500" as the data quantity. This indicates that a network printer 200 specified by a printer ID "001" is assigned an IP address "192.168.1.10" and a subnet mask "255.255.255.0" and that the remaining quantity of toner and the like, the total number of printed sheets, the total number of activations and the total data quantity of the network printer 200 are 20%, 21,000 sheets, 4 times and 13,500 bits, respectively, on Nov. 14, 2002.

Figure 6:
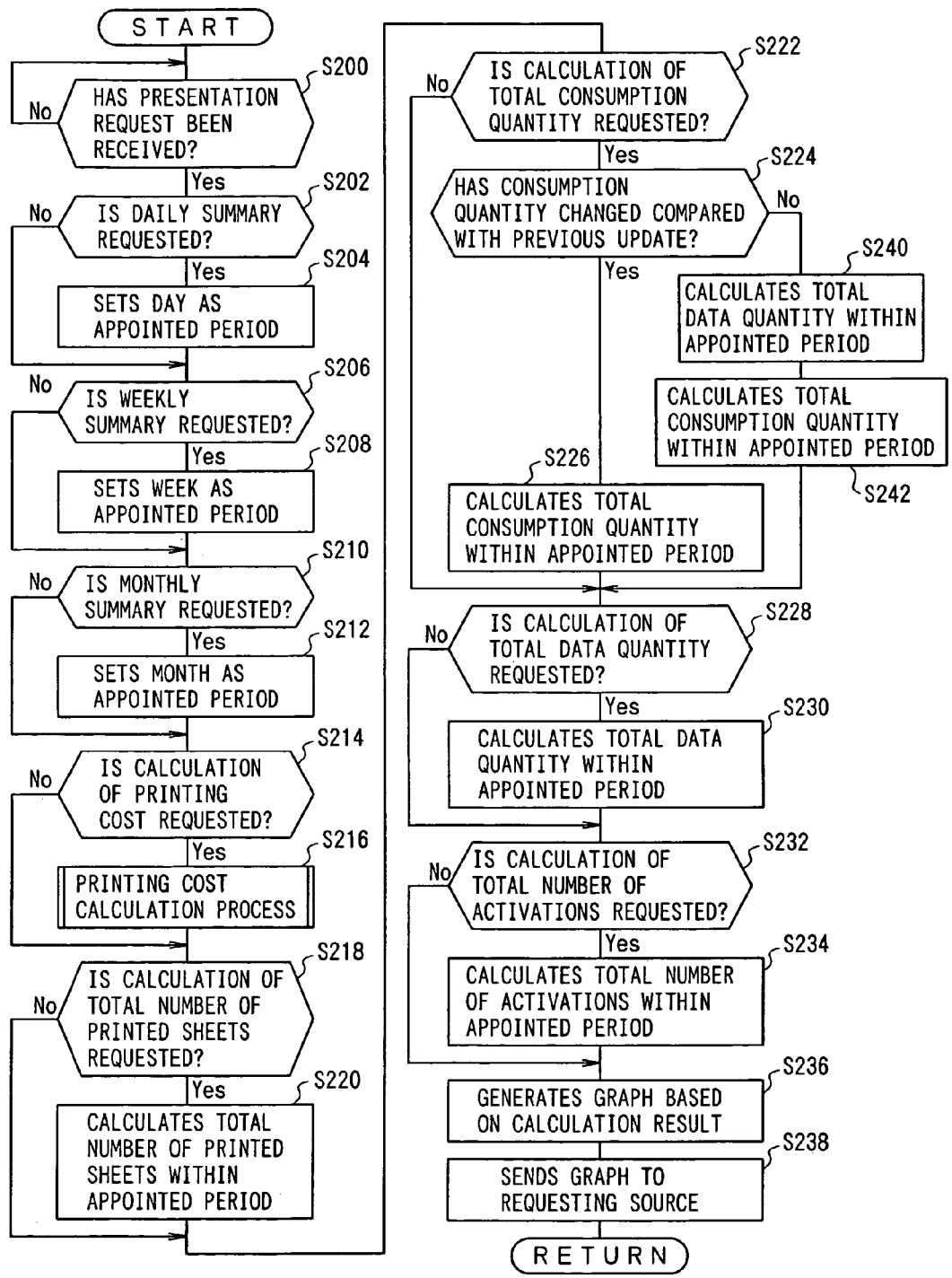
FIG. 6 is a flowchart showing a printer management information presentation process.
Figure 13:
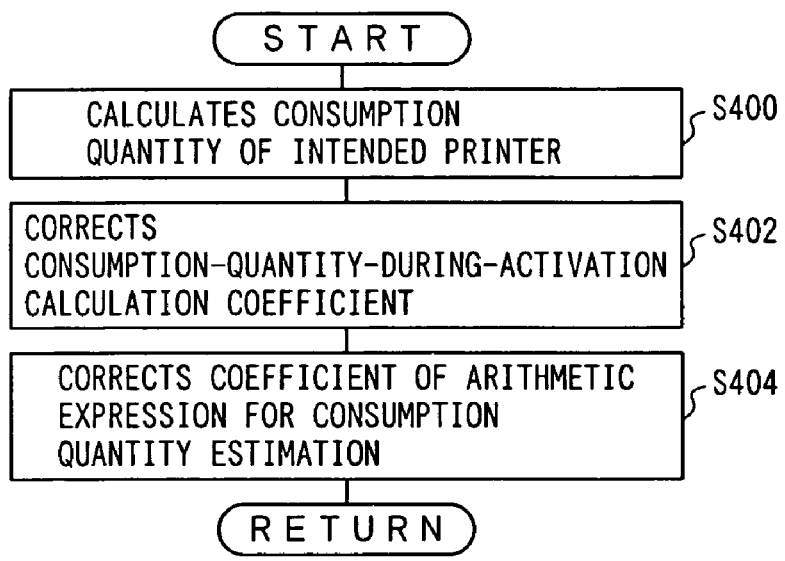
FIG. 13 is a flowchart showing a coefficient correction process.

The CPU 30 consists of a microprocessing unit MPU and the like, activates a predetermined program stored in a predetermined area in the ROM 32, and executes each of a status information registration process, a printer management information presentation process and a coefficient correction process shown in flowcharts in FIGS. 4, 6 and 13, respectively, in time sharing according to the program.

First, a status information registration process is described in detail with reference to FIG. 4.

FIG. 4 is a flowchart showing a status information registration process.

The status information registration process is a process for receiving status information from each network printer 200 to register it. When executed by a CPU 30, the process proceeds to step S100 first as shown in FIG. 4.

At step S100, it is determined whether or not status information has been received. If it is determined that the status information has been received (Yes), then the process proceeds to step S102. Otherwise, the process waits at step S100 until status information is received.

At step S102, the received status information is registered with the status information registration table 400. When the sequential steps are finished, the process returns to the initial step.

FIG. 5 shows a data structure of status information.

Status information is composed of a printer ID, a creation date, a remaining quantity of toner and the like, a total number of printed sheets, a total number of activations and a total data quantity as shown in FIG. 5. In the example in FIG. 5, the remaining quantity of toner and the like and the total data quantity are registered for each color of cyan, magenta, yellow and black.

Then, a printer management information presentation process is described in detail with reference to FIG. 6.

FIG. 6 is a flowchart showing a printer management information presentation process.

The printer management information presentation process is a process for presenting a printing cost of a network printer 200 and other information required for management of the network printer 200, in response to a presentation request by a PC 140, a network printer 200 or other terminals. When executed by the CPU 30, the process proceeds to step S200 first as shown in FIG. 6.

At step S200, it is determined whether or not a presentation request has been received. If it is determined that the presentation request has been received (Yes), then the process proceeds to step S202. Otherwise (No), the process waits at step S200 until a presentation request is received.

At step S202, it is determined whether or not it has been requested by the presentation requesting terminal that printer management information should be daily summed up. If it is determined that printer management information is requested to be daily summed up (Yes), then the process proceeds to step S204 and the appointed period for appointing a period covered by summing up is set as the past one day from the current point of time. The process then proceeds to step S206.

At step S206, it is determined whether or not it has been requested by the presentation requesting terminal that printer management information should be weekly summed up. If it is determined that printer management information is requested to be weekly summed up (Yes), then the process proceeds to step S208 and the appointed period for appointing a period for summing up is set as the past one week from the current point of time. The process then proceeds to step S210.

At step S210, it is determined whether or not it has been requested by the presentation requesting terminal that printer management information should be monthly summed up. If it is determined that printer management information is requested to be monthly summed up (Yes), then the process proceeds to step S212 and the appointed period for appointing a period for summing up is set as the past one month from the current point of time. The process then proceeds to step S214.

At step S214, it is determined whether or not it has been requested by the presentation requesting terminal that a printing cost should be calculated. If it is determined that a printing cost is requested to be calculated (Yes), then the process proceeds to step S216 and a calculation process for calculating a printing cost is executed. The process then proceeds to step S218.

At step S218, it is determined whether or not it has been requested by the presentation requesting terminal that a total number of printed sheets should be calculated. If it is determined that a total number of printed sheets is requested to be calculated (Yes), then the process proceeds to step S220 and calculates the total number of printed sheets within a appointed period for a network printer 200 related to the presentation request (hereinafter referred to as an appointed network printer 200) based on the status information registration table 400. The process then proceeds to step S222.

At step S222, it is determined whether or not it has been requested by the presentation requesting terminal that a total consumption quantity of toner and the like should be calculated. If it is determined that a total consumption quantity is requested to be calculated (Yes), then the process proceeds to step S224, where the most recently created status information and status information immediately preceding the most recently created status information in the status information registration table 400 are compared, for the appointed network printer 200, to determine whether or not there is any change in the remaining quantity of toner and the like. If it is determined that there is change in the toner and the like (Yes), the process proceeds to step S226, where the total consumption quantity of toner and the like within the appointed period is calculated for the appointed network printer 200 based on the status information registration table 400. The process then proceeds to step S228. The total consumption quantity of toner and the like within the appointed period can be calculated by subtracting the remaining quantity of toner and the like at the first point of the appointed period from that at the last point of the appointed period. In the case where toner and the like is exchanged within the appointed period, a value obtained by multiplying the initial capacity of the toner and the like by the number of exchanges is added. The same is true for calculation of a total number of printed sheets, a total number of activations and a total data quantity.

At step S228, it is determined whether or not it has been requested by the presentation requesting terminal that a total data quantity of toner and the like should be calculated. If it is determined that a total data quantity is requested to be calculated (Yes), then the process proceeds to step S230, where the total data quantity within the appointed period is calculated based on the status information registration table 400 for the appointed network printer 200. Then the process proceeds to step S232.

At step S232, it is determined whether or not it has been requested by the presentation requesting terminal that a total number of activations should be calculated. If it is determined that a total number of activations is requested to be calculated (Yes), then the process proceeds to step S234, where the total number of activations within the appointed period is calculated based on the status information registration table 400 for the appointed network printer 200. Then the process proceeds to step S236.

At step S236, a graph is generated based on the calculation result obtained at any of steps S216, S220, S226, S230, S234 and S242. Then the process proceeds to step S238, where the generated graph is sent to the presentation requesting terminal. When the sequential steps are finished, the process ends and returns to the initial step.

If it is determined that a total number of activations is not requested to be calculated by the presentation requesting terminal (No) at step S232, then the process proceeds to step S236.

If it is determined that a total data quantity is not requested to be calculated by the presentation requesting terminal (No) at step S228, then the process proceeds to step S232.

If it is determined that there is no change in the remaining quantity of toner and the like (No) at step S224, then the process proceeds to step S240, where the total data quantity within the appointed period is calculated based on the status information registration table 400 for the appointed network printer 200. Then, the process proceeds to step S242, where the total consumption quantity of toner and the like within an appointed period is calculated from a predetermined arithmetic expression for consumption quantity estimation, and proceeds to step S228. An appointed calculation method performed at step S242 is identical to that performed at step S314 (to be described later) and, therefore, will be described in detail in the explanation of the step.

If it is determined that a total consumption quantity of toner and the like is not requested to be calculated by the presentation requesting terminal (No) at step S222, then the process proceeds to step S228.

If it is determined that the number of printed sheets is not requested to be calculated (No) at step S218, then the process proceeds to step S222.

If it is determined that a printing cost is not requested to be calculated by the presentation requesting terminal (No) at step S214, then the process proceeds to step S218.

If it is determined that printer management information is not requested to be monthly calculated (No) at step S210, then the process proceeds to step S214.

If it is determined that printer management information is not requested to be weekly calculated (No) at step S206, then the process proceeds to step S210.

If it is determined that printer management information is not requested to be daily calculated (No) at step S202, then the process proceeds to step S206.

Next, a printing cost calculation process at step S216 is described in detail with reference to FIG. 7.

Figure 7:
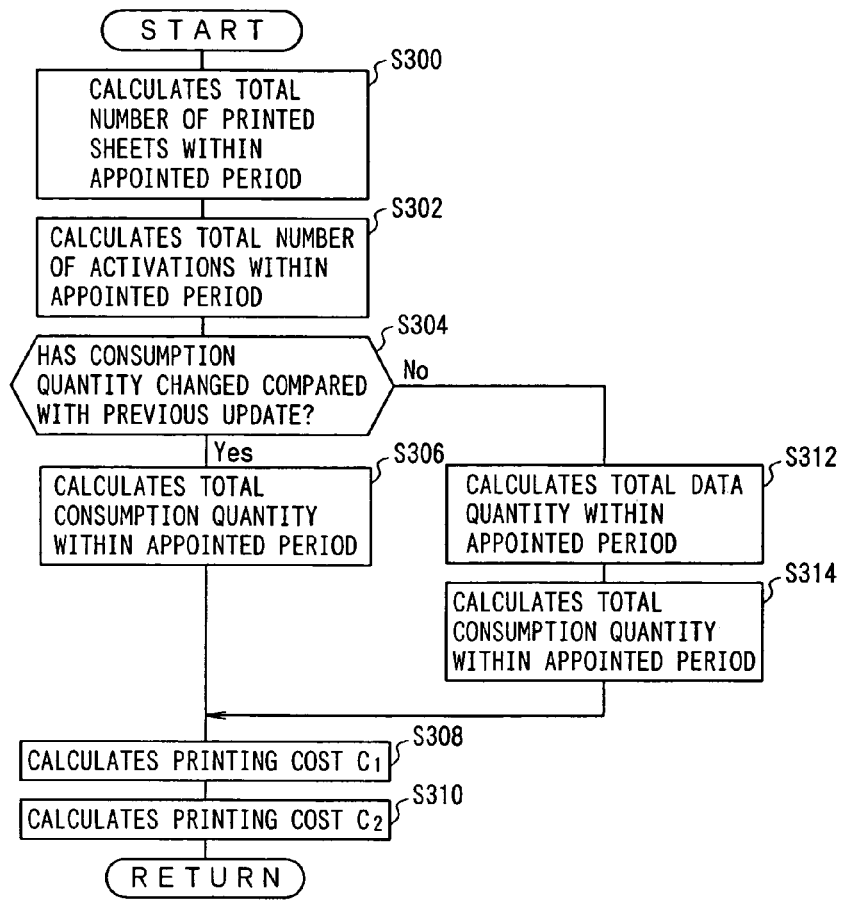
FIG. 7 is a flowchart showing a printing cost calculation process.

FIG. 7 is a flowchart showing a printing cost calculation process.

When executed at step S216, the printing cost calculation process proceeds to step S300 first as shown in FIG. 7.

At step S300, the total number of printed sheets within an appointed period is calculated based on the status information registration table 400 for an appointed network printer 200. The process then proceeds to step S302, where the total number of activations within the appointed period is calculated based on the status information registration table 400 for the appointed network printer 200. The process then proceeds to step S304.

At step S304, the most recently created status information and status information immediately preceding the most recently created status information in the status information registration table 400 are compared for the appointed network printer 200 to determine whether or not there is any change in the remaining quantity of toner and the like. If it is determined that there is any change in the remaining quantity of toner and the like (Yes), then the process proceeds to step S306, where the total consumption quantity of toner and the like within the appointed period is calculated for the appointed network printer 200 based on the status information registration table 400. The process then proceeds to step S308.

At step S308, a printing cost $C_1$ is calculated in consideration of the number of activations of the network printer 200.

Figure 8:
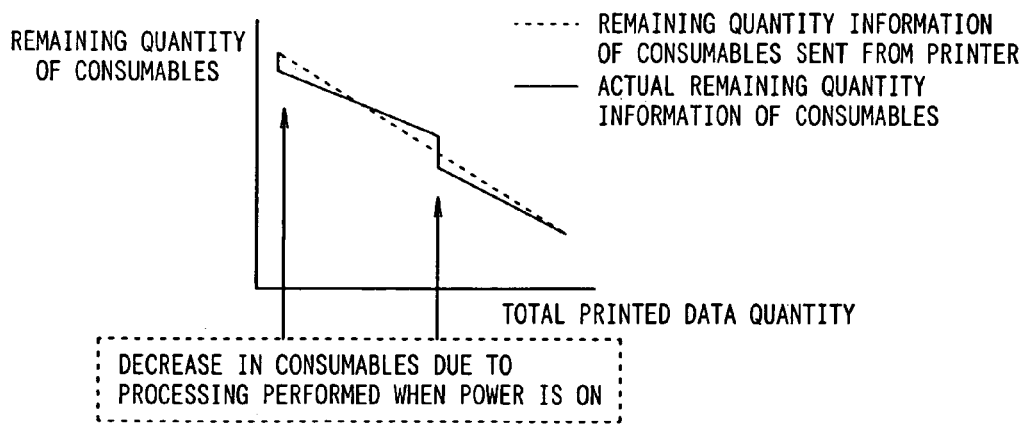
FIG. 8 is a graph showing change in a remaining quantity of toner and the like relative to change in a total data quantity.
Figure 9:
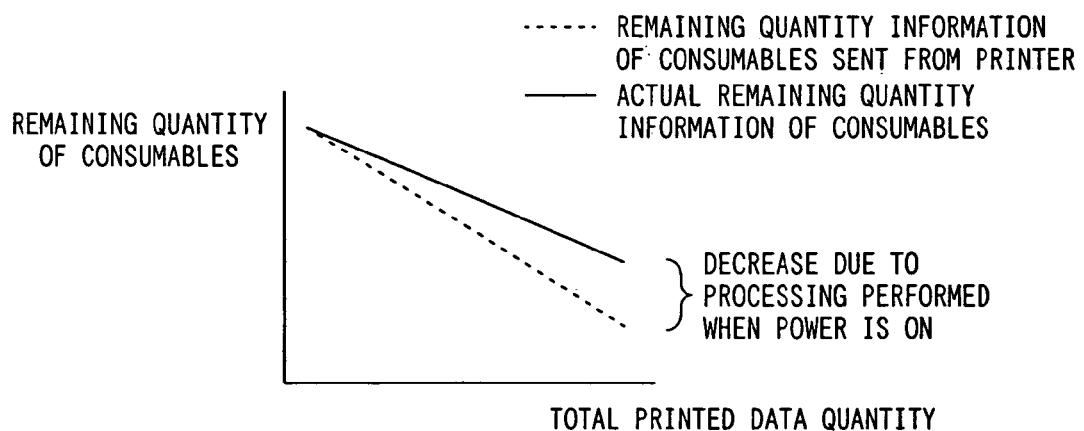
FIG. 9 is a graph showing change in a remaining quantity of toner and the like relative to change in a total data quantity.

FIGS. 8 and 9 are graphs showing change in the remaining quantity of toner and the like relative to change in the total data quantity.

The network printer 200 performs a warm-up operation, a cleaning operation and the like and consumes toner and the like though only slightly during such operation. Actually, when a consumption quantity of toner and the like consumed during power up is taken into consideration, the remaining quantity of toner and the like and the total data quantity are proportional or almost proportional to each other except during activation, but the remaining quantity of toner and the like decreases by a certain quantity each time the printer is activated, as shown in FIG. 8. Therefore, in order to calculate an accurate printing cost, it is necessary to correct the inclination in consideration of the decrease during activation, as shown in FIG. 9. In the graph of FIG. 9, the inclinations before correction and after correction are shown as a full line and a broken line, respectively. Specifically, a printing cost $C_1$ (¥/sheet) can be calculated from the expression (1) below:

$$C_1 = (x + k_1 \times z)/y \times \alpha \qquad (1)$$

where the total consumption quantity within an appointed period is indicated by x (ml); the total number of printed sheets within the appointed period by y (sheets); the total number of activations within the appointed period by z (times); the coefficient consumption-quantity-during-activation calculation coefficient by $k_1$, and the consumption cost per unit of toner and the like by $\alpha$ (¥/ml).

The process then proceeds to step S310, where a printing cost $C_2$ is calculated without consideration of the number of activations of the network printer 200. Specifically, the printing cost $C_2$ (¥/sheet) can be calculated from the expression (2) below:

$$C_2 = x/y \times \alpha \qquad (2)$$

where the total consumption quantity within the appointed period is indicated by x (ml); the total number of printed sheets within the appointed period by y (sheets); and the consumption cost per unit of toner and the like by $\alpha$(¥/ml).

When the processing at step S310 is finished, the sequential steps are finished and the returns to the initial step.

If it is determined that there is no change in the remaining quantity of toner and the like at step S304 (No), then the process proceeds to step S312, where the total data quantity within the appointed period is calculated based on the status information registration table 400 for the appointed network printer 200. The process then proceeds to step S314, where the total consumption quantity of toner and the like within the appointed period is calculated from a predetermined arithmetic expression for consumption quantity estimation based on the calculated total data quantity.

Figure 10:
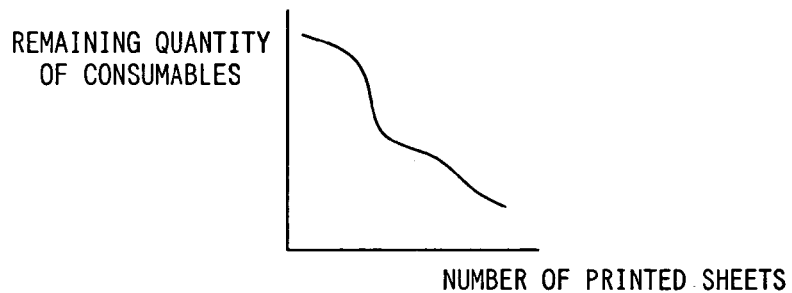
FIG. 10 is a graph showing change in a remaining quantity of toner and the like relative to change in a total number of printed sheets.
Figure 11:
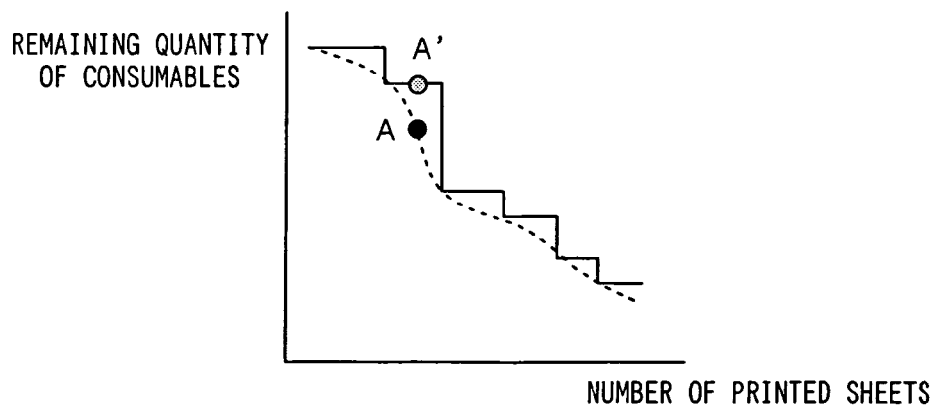
FIG. 11 is a graph showing change in a remaining quantity of toner and the like relative to change in a total number of printed sheets.

FIGS. 10 and 11 are graphs showing change in a remaining quantity of toner and the like relative to change in a total number of printed sheets.

Figure 12:
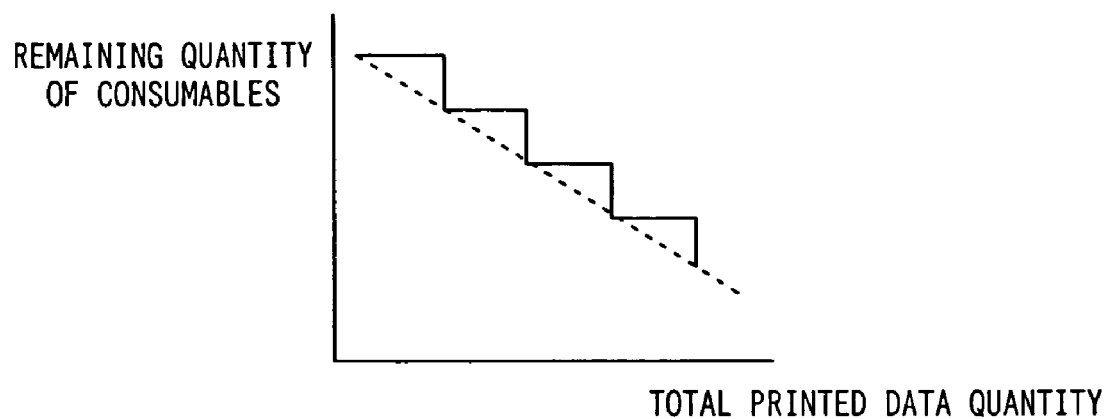
FIG. 12 is a graph showing change in a remaining quantity of toner and the like relative to change in a total data quantity.

FIG. 12 is a graph showing change in a remaining quantity of toner and the like relative to change in a total data quantity.

A total number of printed sheets and a remaining quantity of toner and the like are usually not accurately proportional to each other as shown in FIG. 10. When accuracy of detecting a remaining quantity of toner and the like in a network printer 200 is not high, decrease is collectively shown when a certain quantity has been printed, and a staircase change is shown as in FIG. 11. In the graph in FIG. 11, the actual decay curve is shown as a broken line, ant the decay curve calculated based on a notification from a network printer 200 is shown as a full line. When a presentation request is made at the point of A in FIG. 11, an accurate total consumption quantity cannot be calculated from status information, and a printing cost is calculated based on the actually measured value A' unless some measures are taken. In this case, it may be more accurate to estimate a total consumption quantity from a total data quantity than to use the actually measured value A'. This is because a remaining quantity of toner and the like is not very proportional to a total number of printed sheets but is proportional or almost proportional to a data quantity as shown in FIG. 12. Accordingly, by taking a data quantity into consideration, the total consumption quantity can be relatively accurately calculated even when accuracy of detecting a remaining quantity of toner and the like is not high. Specifically, a total consumption quantity U (ml) can be calculated from the arithmetic expression for consumption quantity estimation (3) below:

$$U=k_2 \times d+k_3 \tag{3}$$

where the total data quantity within an appointed period is indicated by d (bits) and consumption quantity estimation coefficients by $k_2$ and $k_3$.

When the processing at step S314 is finished, the process proceeds to step S308.

Then, a coefficient correction process is described in detail with reference to FIG. 13.

FIG. 13 is a flowchart showing a coefficient correction process.

The coefficient correction process is a process executed for each network printer 200 in a fixed cycle. When executed by the CPU 30, the process proceeds to step S400 as shown in FIG. 13.

At step S400, a consumption quantity of toner and the like is calculated for more than two different dates for a target network printer 200, based on a status information registration table 400. The process then proceeds to step S402.

At step S402, the consumption-quantity-during-activation calculation coefficient $k_1$ is so corrected that the inclination of the graph in FIG. 9 follows the actually measured values. The process then proceeds to step S404, where the consumption quantity estimation coefficients $k_2$ and $k_3$ are so corrected that the inclination and the offset of the graph in FIG. 12 follow the actually measured values. When the sequential steps are finished, the process returns to the initial step.

Then, a configuration of a network printer 200 is described in detail with reference to FIG. 14. Each network printer 200 is configured to have the same function.

Figure 14:
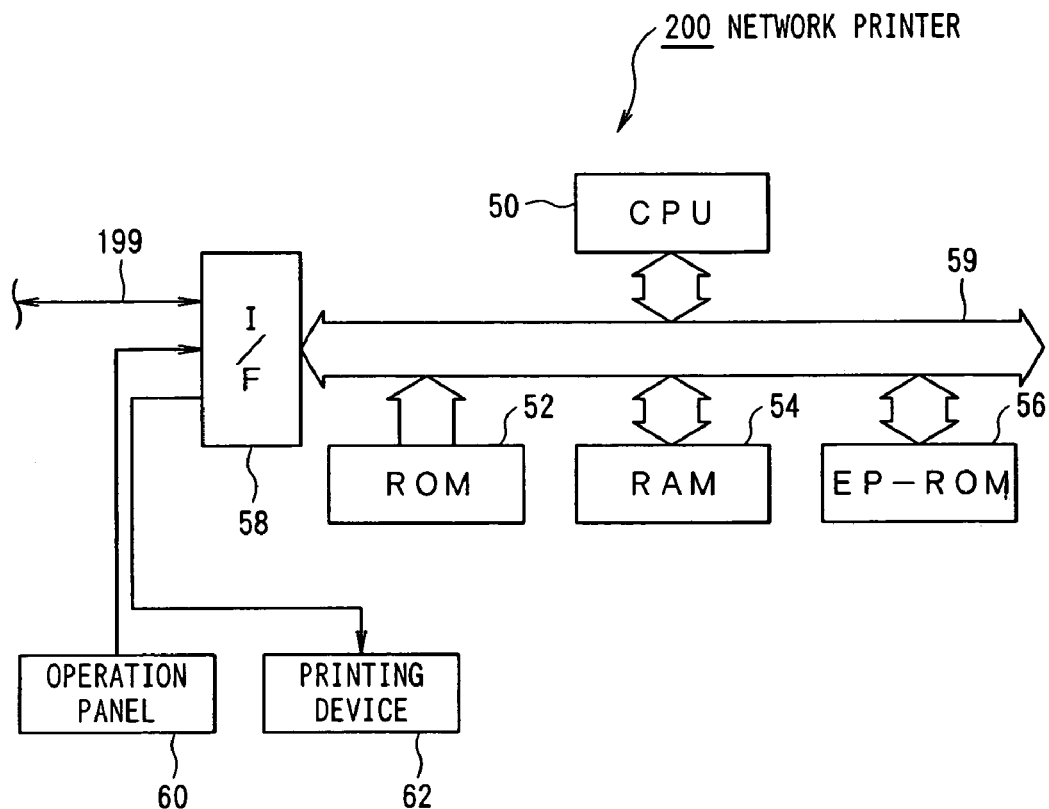
FIG. 14 is a block diagram showing a configuration of a network printer 200.

FIG. 14 is a block diagram showing a configuration of a network printer 200.

The network printer 200 is composed of a CPU 50 controlling operation and the entire system based on a control program, a ROM 52 with the control program and the like of the CPU 50 stored in a predetermined area in advance, a RAM 54 for storing data read from the ROM 52 and the like and storing results of operation in an operation process of the CPU 50, an EPROM 56 for storing basic information of printers and other information to be held nonvolatilely, and an I/F 58 for mediating input/output of data to/from an external device, as shown in FIG. 14. These are mutually connected via a bus 59, a signal line for transferring data in a manner that they can send and receive data one another.

An operation panel 60 which enables data input as a human interface, a printing device 62 for performing printing based on data to be printed, and a bus line to be connected to the Internet 199 are connected to the I/F 58 as external devices.

Figure 15:
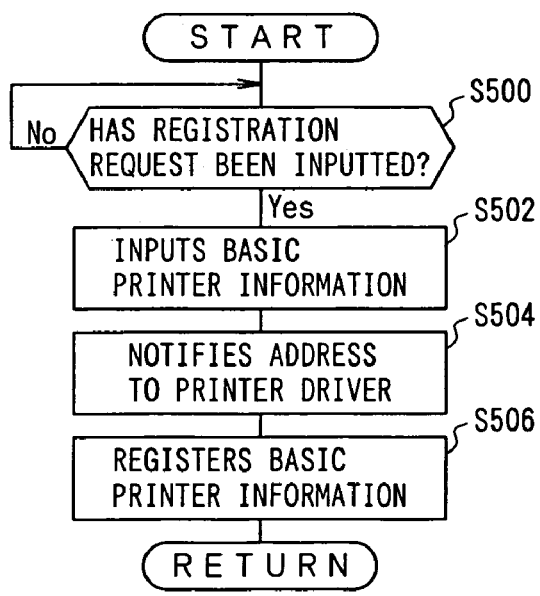
FIG. 15 is a flowchart showing a basic printer information registration process.
Figures 16, 17:
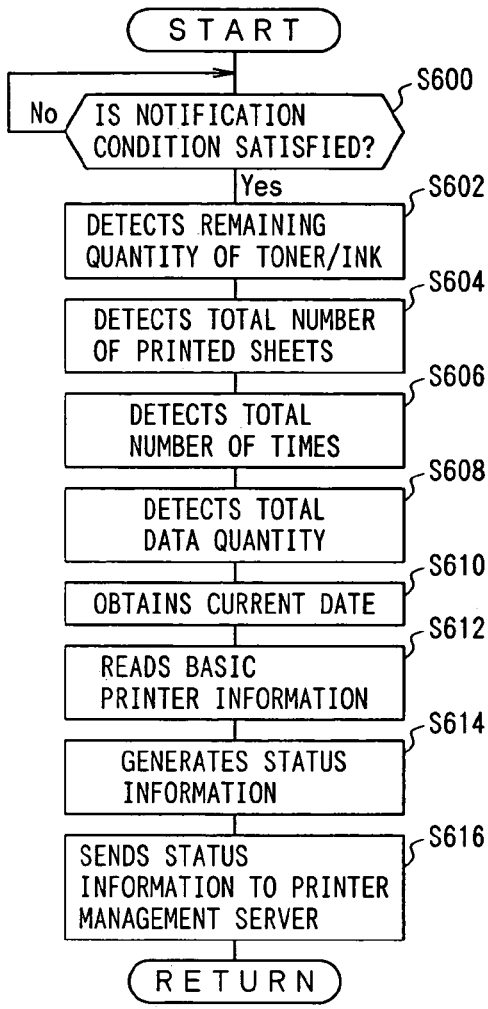
FIG. 16 is a flowchart showing a status information generation process.
FIG. 17 shows a display screen of a management menu.

The CPU 50 consists of a microprocessing unit MPU and the like, activates a predetermined program stored in a predetermined area in the ROM 52, and executes a basic printer information registration process and a status information generation process shown in FIGS. 15 and 16, respectively, in time sharing according to the program.

First, a basic printer information registration process is described in detail with reference to FIG. 15.

FIG. 15 is a flowchart showing a basic printer information registration process.

The basic printer information registration process is a process for registering basic information required when a network printer 200 communicates with a printer management server 100. When executed by the CPU 50, the process proceeds to step S500 first as shown in FIG. 15.

At step S500, it is determined whether or not a registration request for requesting registration of basic printer information has been inputted from an operation panel 60. If it is determined that a registration request has been received (Yes), then the process proceeds to step S502. Otherwise (No), the process waits at step S500 until a registration request is inputted.

At step S502, basic printer information is inputted from the operation panel 60. The basic printer information includes, for example, an IP address, a subnet mask, a default gateway address and a printer ID to be assigned to the network printer 200, an IP address of the printer management server 100 (hereinafter referred to as a server IP address), a port number of an IP to be used for communication with the printer management server 100, and a status information notification condition indicating a condition to notify status information. As the status information notification condition, a condition can be set, for example, which specifies that the status information should be notified when the basic printer information is updated; it should be notified at a appointed date; it should be notified at appointed time intervals; it should be notified when the remaining quantity of toner and the like is below a predetermined threshold; or it should be notified when any fault is caused in the network printer 200.

The process then proceeds to step S504, where the IP address, the subnet mask and the default gateway address in the inputted basic printer information are notified to a printer driver to set the addresses for the network printer 200. The process then proceeds to step S506, where the inputted basic printer information is registered with an EPROM 56. When the sequential steps are finished, the process returns to the initial step.

Then, a status information generation process is described in detail with reference to FIG. 16.

FIG. 16 is a flowchart showing a status information generation process.

The status information generation process is a process for generating status information based on a status information notification condition. When executed by a CPU 50, the process proceeds to step S600 as shown in FIG. 16.

At step S600, it is determined whether or not status information notification condition is satisfied. If it is determined that the status information notification condition is satisfied (Yes), then the process proceeds to step S602. Otherwise (No), the process waits at step S600 until the status information notification condition is satisfied.

At step S602, a remaining quantity of toner and the like is detected and the process proceeds to step S604, where a total number of printed sheets is detected. The process then proceeds to step S606, where a total number of activations is detected, and proceeds to step S608, where a total data quantity is detected. The process then proceeds to step S610.

At step S610, the current date can be obtained from a timer (not shown) and the like. The process then proceeds to step S612, where basic printer information is read from an EPROM 56, and proceeds to step S614.

At step S614, status information is generated based on the remaining quantity of toner and the like, the total number of printed sheets, the total number of activations and the total data quantity detected at steps S602 to S608, the current date obtained at step S610 and the basic printer information read at step S612. The process then proceeds to step S616, where the generated status information is sent to a printer management server 100 based on a server IP address and a port number in the read basic printer information. When the sequential steps are finished, the process returns to the initial step.

The operation of this embodiment is now described.

First, registration of basic printer information for a network printer 200 is described.

A user inputs a request for registration of basic printer information from an operation panel 60 of the network printer 200, and inputs the basic printer information from the operation panel 60 in accordance with guidance shown by a menu and the like.

When the basic printer information has been inputted in the network printer 200, an IP address, a subnet mask and a default gateway address in the inputted basic printer information are notified to a printer driver at step S504. Thereby, these dresses are set for the network printer 200, and the network printer 200 is prepared for communication with a printer management server 100. Then the inputted basic printer information is registered with an EPROM 56 at step S506.

Next, notification of status information by a network printer 200 is described.

When "at appointed time intervals" is set as a status information notification condition for the network printer 200, a remaining quantity of toner and the like, a total number of printed sheets, a total number of activations and a total data quantity of the network printer 200 are detected, the current date is obtained, and basic printer information is read from an EPROM 56 at steps S602 to S612 at the appointed time intervals. Then, at steps S614 to S616, status information is generated based on the remaining quantity of toner and the like, the total number of printed sheets, the total number of activations, the total data quantity, the current date and the basic printer information; and the generated status information is sent to a printer management server 100 based on the IP address and the port number in the read basic printer information.

In the printer management server 100, when the status information is received, the received status information is registered with a status information registration table 400 at step S102.

Next, calculation of a printing cost of a network printer 200 is described.

When calculating a printing cost, a user or an administrator of the network printer 200 first requests presentation of printer management information at a PC 140.

In the PC 140, when the network printer 200 is appointed and presentation of the printer management information is requested, a management menu as shown in FIG. 17 is shown on a display and the like.

FIG. 17 shows a display screen of a management menu.

The management menu in FIG. 17 is composed of an item for selecting a summing-up period, an item for selecting data to be graphed, an OK button and a cancel button. At the item for selecting a summing-up period, it is selected that the printer management information should be summed up daily, weekly or monthly. At the item for selecting data to be graphed, any one of or a plurality of cost per sheet (printing cost $C_1$), running cost (printing cost $C_2$), the number of printed sheets, operation time, a remaining quantity of consumables, a printed data quantity and the number of power-source operations (the number of activations) are selected. For example, if the user selects "daily" as the summing-up period, and "cost per sheet", "running cost", "the number of printed sheets" and "remaining quantity of consumables" as data to be graphed, then these requests as well as the request for presentation of the printer management information are sent to a printer management server 100 by the PC 140.

In the printer management server 100; when a request that the printer management information should be daily summed is made as well as a presentation request, the past one day from the current point of time is set as an appointed period at step S204. When a request for calculation of a printing cost is made, a printing cost calculation process is executed at step S216.

In the printing cost calculation process, the total number of printed sheets and the total number of activations within an appointed period are first calculated for a network printer 200 based on a status information registration table 400 at steps S300 and S302. Then at step S304, the most recently created status information and status information immediately preceding the most recently created status information in the status information registration table 400 are compared for the appointed network printer 200 to determine whether or not there is any change in the remaining quantity of toner and the like. If it is determined that there is any change in the remaining quantity of toner and the like, then at steps S306 to S310, the total consumption quantity of toner and the like within the appointed period is calculated for the appointed network printer 200, and a printing cost $C_1$ and a printing cost $C_2$ are calculated from the above-mentioned expressions (1) and (2), respectively.

In contrast, if it is determined there is no change in the remaining quantity of toner and the like, then at steps S312 and S314, the total data quantity within the appointed period is calculated for the appointed network printer 200 based on the status information registration table 400, and the total consumption quantity $U$ of toner and the like within the appointed period is calculated from the above expression for consumption quantity estimation (3) based on the calculated total data quantity. Then, at steps S308 and S310, a printing cost $C_1$ and a printing cost $C_2$ are calculated from the above-mentioned expressions (1) and (2), respectively.

Figure 18:
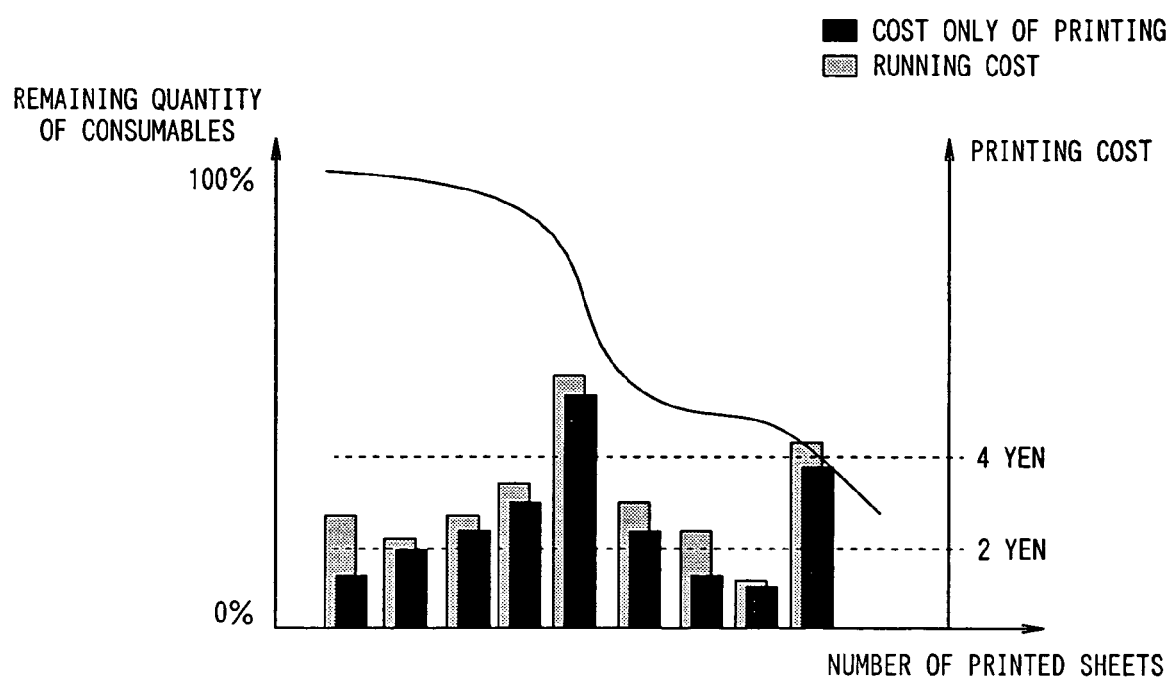
FIG. 18 is a graph showing change in printing costs $C_1$ and $C_2$ relative to change in a total number of printed sheets.

Thus, when the printing costs $C_1$ and $C_2$ are calculated, a graph as shown in FIG. 18 is generated, and the generated graph is sent to a PC 140 at steps S236 and S238.

FIG. 18 is a graph showing change in the printing costs $C_1$ and $C_2$ relative to change in the total number of printed sheets.

In this way, according to this embodiment, a network printer 200 detects a remaining quantity of toner and the like, a total number of printed sheets and a total number of activations and sends status information including the detected remaining quantity of toner and the like, total number of printed sheets and total number of activations to a printer management server 100. And the printer management server 100, when receiving the status information, registers the received status information with a status information registration table 400; calculates an average consumption quantity per print sheet (hereinafter refereed to as an average consumption quantity) by calculating the total consumption quantity of toner and the like, the total number of printed sheets and the total number of activations within an appointed period based on the status information registration table 400, multiplying the total number of activations by a consumption-quantity-during-activation calculation coefficient $k_1$, and dividing the multiplication result added to the total consumption quantity of toner and the like by the total number of printed sheets Thus, the number of activations of the network printer 200 is taken into consideration in calculation of an average consumption quantity, so that the average consumption quantity within an appointed period can be relatively accurately calculated in comparison with the prior-art techniques.

Furthermore, according to this embodiment, the printer management server 100 calculates a total consumption quantity of toner and the like based on the status information registration table 400 and corrects a consumption-quantity-during-activation calculation coefficient $k_1$ based on the calculated total consumption quantity of toner and the like.

This enables the average consumption quantity to be calculated more accurately, and thereby a printing cost depending on use environments can be more accurately calculated.

Furthermore, according to this embodiment, the printer management server 100 compares the most recently created status information and status information immediately preceding the most recently created status information in the status information registration table 400, and when it is determined that there is no change in the remaining quantity of toner and the like, it calculates an average consumption quantity by calculating the total data quantity within an appointed period based on the status information registration table 400, estimating the total consumption quantity of toner and the like from an arithmetic expression for consumption quantity estimation based on the calculated total data quantity, and dividing the multiplication result added to the total consumption quantity of toner and the like by the total number of printed sheets.

Thus, data quantity is taken into consideration in calculation of an average consumption quantity, so that the average consumption quantity can be relatively accurately calculated. Accordingly, by taking a data quantity into consideration, a printing cost depending on use environments can be relatively accurately calculated even when accuracy of detecting a remaining quantity of toner and the like is not high.

Furthermore, according to this embodiment, the printer management server 100 multiplies the total data quantity by a consumption quantity estimation coefficient $k_2$ and adds a consumption quantity estimation coefficient $k_3$ to the multiplication result.

This enables the average consumption quantity to be more accurately calculated, so that a printing cost depending on use environments can be more accurately calculated even when accuracy of detecting a remaining quantity of toner and the like is not high.

Furthermore, according to this embodiment, a printer management server 100 calculates the total consumption quantity of toner and the like based on the status information registration table 400, and corrects the consumption quantity estimation coefficients $k_2$ and $k_3$ based on the calculated total consumption quantity of toner and the like.

This enables the average consumption quantity to be more accurately calculated, so that a printing cost depending on use environments can be more accurately calculated.

Furthermore, according to this embodiment, a period to be appointed is any of the past one day, one week or one month from the current point of time.

This enables the printing cost to be calculated for any of the past one day, one week or one month from the current point of time.

Furthermore, according to this embodiment, the printer management server 100 calculates an average consumption quantity by calculating the total consumption quantity of toner and the like within an appointed period based on the status information registration table 400 and dividing the total consumption quantity of toner and the like by the total number of printed sheets.

This enables the printing cost to be calculated for each of the cases where a quantity consumed during activation is taken into consideration and where the quantity consumed during activation is not taken into consideration.

In the embodiment described above, the printer management server 100 corresponds to the printer management terminal according to any of the inventions 3 to 6, 8, or 11 to 22; the network printer 200 to the device according to any of the inventions 1, 2, 23 or 24, and the storage device 42 to the status information storing section according to any of the inventions 4 to 6, 8, 9, 12 or 14. The step S100 corresponds to the status information receiving section according to any of the inventions 3, 4, 13 to 16, 19 or 20. The steps S300 to S308, S312 and S314 correspond to the consumption ratio calculating section according to any of the inventions 1 to 4, 6, 9, 11, 13 to 16, 19 or 20 or the consumption ratio calculating step according to the invention 23 or 24.

In the embodiment described above, the steps S300, S304, S306, S310, S312 and S314 correspond to the second consumption ratio calculating section according to the invention 12. The step S308 corresponds to the running cost calculating section according to the invention 11, and the step S402 corresponds to the predetermined value correcting section according to the invention 5. The step S404 corresponds to the arithmetic expression correcting section according to the invention 8, and the steps S602, S616 and S100 correspond to the utilization degree obtaining section according to the invention 1 or the utilization degree obtaining step according to the invention 23. The step S602 corresponds to the utilization quantity detecting section according to any of the inventions 3, 6, 17 or 21.

Furthermore, in the embodiment described above, the steps S604, S616 and S100 correspond to the generation quantity obtaining section according to the invention 1 or 2, or the generation quantity obtaining step according to the invention 23 or 24. The step S604 corresponds to the section for detecting the number of printed sheets according to the inventions 3, 6, 13, 17, 18, 21 or 22. The step S606 corresponds to the section for counting the number of activations according to the invention 1, 3, 6, 17 or 21, or the step of counting the number of activations according to the invention 23. The steps S608, S616 and S100 correspond to the data quantity obtaining section according to the invention 2, or the data quantity obtaining step according to the invention 24.

Furthermore, in the embodiment described above, the step S608 corresponds to the printed data quantity detecting section according to the invention 6, 13, 18 or 22, and the step S616 corresponds to the status information sending section according to the invention 3, 6, 13, 17, 18, 21 or 22. The arithmetic expression for consumption quantity estimation corresponds to the predetermined arithmetic expression according to the invention 6, 7, 9 or 14. The consumption quantity estimation coefficient $k_2$ corresponds to the predetermined coefficient according to the invention 7 or 8, and the consumption quantity estimation coefficient $k_3$ corresponds to the predetermined constant according to the invention 7 or 8. The toner and the like corresponds to the consumables according to any of the inventions 1 to 4, 9, 11 to 14, 17, 21, 23 or 24, and the remaining quantity of toner and the like corresponds to the utilization quantity according to any of the inventions 3 to 6, 8, 9, 12, 15, 17, 19 or 21.

Furthermore, in the embodiment described above, the printed matter corresponds to the product according to the invention 1, 2, 23 or 24, and the printed data quantity corresponds to the generation quantity according to the invention 1, 2, 23 or 24. The data to be printed corresponds to the data to be generated according to the invention 2 or 24.

In the embodiment described above, though fixed values were used as parameters such as a consumption quantity cost per unit of toner and the like, the parameters such as a consumption quantity cost per unit of toner and the like may be so provided that they may be changed in a PC 140 and the like as shown in FIG. 19.

FIG. 19 shows an input screen for changing parameters.

In the example in FIG. 19, the average number of printed sheets per day, the average number of power-source operations (activations) per day, an average printed data quantity per printing, a consumption quantity cost per unit of color toner and the like, and a consumption quantity cost per unit of black toner are shown as parameters which can be inputted and changed by a user.

Though, in the embodiment described above, a request for presentation of printer management information was made to the printer management server 100 by the PC 140, it is also possible that a request for presentation of printer management information is made to the printer management server 100 by the network printer 200 or other terminals only if it is communicatively connected to the printer management server 100.

Though, in the embodiment described above, network printers 200 were managed, it is also possible to manage a projector, scanner, digital camera, digital video camera, personal computer, PDA (personal digital assistant), network storage, audio equipment, mobile telephone, PHS (registered trademark; Personal Handyphone System), watch-type PDA, STB (set top box), POS (point of sale) terminal, copy machine, FAX machine, telephone (including an IP telephone), exchange, NCU (network control unit), router, hub, bridge and other equipment available in a network.

Though, in the embodiment described above, a case was explained where a control program stored in a ROM 32 in advance is executed to perform the processes shown by the flowcharts in FIGS. 4, 6, 7 and 13, it is also possible to read a program indicating those procedures from a storage medium storing the program, into a RAM 34 to execute the program.

Though, in the embodiment described above, a case was explained where a control program stored in a ROM 52 in advance is executed to perform the processes shown by the flowcharts in FIGS. 15 and 16, it is also possible to read a program indicating those procedures from a storage medium storing the program, into a RAM 54 to execute the program.

The storage medium here may be a semiconductor storage medium such as RAM and ROM, a magnetic storage medium such as FD and HD, an optical-reading-system storage medium such as CD, CDV, LD and DVD, or a magnetic storage type/optical-reading-system storage medium such as MO, and any computer-readable storage medium is included irrespective of whether the adopted reading system is electronic, magnetic, or optical.

Though, in the embodiment described above, a case was explained where a device management system, a printer management system, a printer management terminal, a network printer, a program for a terminal and a program for a printer, and a device management method according to the present invention are applied to a network system consisting of the Internet 199, it is also possible to apply them to a so-called intranet, in which communication is performed in the same method as that of the Internet 199, for example. Of course, they may be applied not only to a network, in which communication is performed in the same method as that of the Internet 199, but also to an ordinary network.

Though, in the embodiment described above, a case was explained where a device management system, a printer management system, a printer management terminal, a network printer, a program for a terminal and a program for a printer, and a device management method according to the present invention are applied to management of a consumption quantity of consumables used for printing by a network printer 200 with a printer management server 100 as shown in FIG. 1, it is also possible to apply them to other cases without departing from the spirit of the present invention.

The entire disclosure of Japanese Patent Application No. 2002-359766 filed Dec. 11, 2002 is hereby incorporated by reference.

What is claimed is:

1. A device management system for managing the quantity of consumables consumed by operation of a device; the system comprising:
   utilization degree obtaining section for obtaining a utilization degree indicating a degree of utilization of the consumables; generation quantity obtaining section for obtaining the quantity of a product generated by consumption of the consumables; section for counting the number of activations for counting the number of activations of the device; and consumption ratio calculating section for calculating the ratio of the consumption quantity to the generation quantity based on the utilization degree obtained by the utilization degree obtaining section, the generation quantity obtained by the generation quantity obtaining section and the number of activations counted by the section for counting the number of activations.

2. A printer management system for communicatively connecting a network printer and a printer management terminal for managing the network printer and for managing a consumption quantity of consumables used for printing by the network printer;
   the network printer comprising: utilization quantity detecting section for detecting a utilization quantity of the consumables; section for detecting the number of printed sheets for detecting the number of sheets of printed matter printed by the network printer; section for counting the number of activations for counting the number of activations of the network printer; and status information sending section for sending status information including the utilization quantity detected by the utilization quantity detecting section, the number of printed sheets detected by the section for detecting the number of printed sheets and the number of activations counted by the section for counting the number of activations, to the printer management terminal; and the printer management terminal comprising: status information receiving section for receiving the status information; and consumption ratio calculating section for calculating the ratio of the consumption quantity to the number of printed sheets based on the status information received by the status information receiving section.

3. The printer management system according to claim 2; wherein the printer management terminal further comprises status information storing section for storing the status information;

the status information receiving section receives the status information and stores the received status information in the status information storing section; and the consumption ratio calculating section calculates an average consumption quantity per print sheet by specifying the total consumption quantity of the consumables from a predetermined reference point of time based on the utilization quantity included in the status information in the status information storing section, specifying the total number of printed sheets from the predetermined reference point of time based on the total number of printed sheets included in the status information in the status information storing section, specifying the total number of activations from the predetermined reference point of time based on the number of activations included in the status information in the status information storing section, multiplying the total number of activations by a predetermined value, and dividing the multiplication result added to the total consumption quantity by the total number of printed sheets.

4. The printer management system according to claim 3; wherein the printer management terminal further comprises predetermined value correcting section for specifying the total consumption quantity based on the utilization quantity included in the status information in the status information storing section and correct the predetermined value based on the specified total consumption quantity.

5. The printer management system according to any of claims 3 and 4; wherein the network printer further comprises printing section for performing printing based on received data to be printed and printed data quantity detecting section for detecting the quantity of printed data;

the status information sending section sends the status information including the utilization quantity detected by the utilization quantity detecting section, the number of printed sheets detected by the section for detecting the number of printed sheets, the number of activations counted by the section for counting the number of activations and the data quantity detected by the printed data quantity detecting section, to the printer management terminal; and the consumption ratio calculating section compares the newest status information and status information immediately preceding the newest status information and, if it is determined that there is change in the data quantity but no change in the utilization quantity, calculates an average consumption quantity per print sheet by specifying an total data quantity from the predetermined reference point of time based on the data quantity included in the status information in the status information storing section, estimating the total consumption quantity from a predetermined arithmetic expression based on the specified total data quantity, dividing the multiplication result added to the total consumption quantity by the total number of printed sheets.

6. The printer management system according to claim 5; wherein the predetermined arithmetic expression is for multiplying the total data quantity by a predetermined coefficient and adding a predetermined constant to the multiplication result.

7. The printer management system according to claim 6; wherein the printer management terminal further comprises arithmetic expression correcting section for specifying the total consumption quantity based on the utilization quantity included in the status information in the status information storing section to correct the predetermined coefficient and the predetermined constant based on the specified total consumption quantity.

8. The printer management system according to claim 5; wherein the consumption ratio calculating section compares the newest status information and status information immediately preceding the newest status information and, if it is determined that there is change in the data quantity but no change in the utilization quantity, calculates an average consumption quantity per print sheet by specifying the total data quantity within a predetermined period based on the data quantity included in the status information in the status information storing section, estimating the total consumption quantity of the consumables within the predetermined period from the predetermined arithmetic expression, based on the specified total data quantity, specifying the total number of printed sheets within the predetermined period based on the number of printed sheets included in the status information in the status information storing section, specifying the total number of activations within the predetermined period based on the number of activations included in the status information in the status information storing section, multiplying the total number of activations by a predetermined value, and dividing the multiplication result added to the total consumption quantity by the total number of printed sheets.

9. The printer management system according to claim 8; wherein the predetermined period is any of the past one day, one week and one month.

10. The printer management system according to claim 2; wherein the printer management terminal further comprises running cost calculating section for calculating a running cost of the consumables based on the calculation result of the consumption ratio calculating section.

11. The printer management system according to claim 2; wherein the printer management terminal further comprising second consumption ratio calculating section for calculating the ratio of the consumption quantity to the number of printed sheets based on the status information; and the second consumption ratio calculating section calculates an average consumption quantity per print sheet by specifying the total consumption quantity of the consumables from a predetermined reference point of time based on the utilization quantity included in the status information in the status information storing section, specifying the total number of printed sheets from the predetermined reference point of time based on the number of printed sheets included in the status information in the status information storing section, and dividing the total consumption quantity by the total number of printed sheets.

12. A printer management terminal communicatively connected to the network printer in the printer management system of claim 2; the printer management terminal comprising:
   status information receiving section for receiving status information including the utilization quantity, the number of printed sheets and the number of activations; and consumption ratio calculating section for calculating the ratio of the consumption quantity to the number of printed sheets based on the status information received by the status information receiving section.

13. A network printer communicatively connected to the printer management terminal in the printer management system of claim 2; the network printer comprising:
   utilization quantity detecting section for detecting a utilization quantity of the consumables; section for detecting the number of printed sheets for detecting the number of sheets of printed matter printed by the network printer; section for counting the number of activations for counting the number of activations of the network printer; and status information sending section for sending status information including the utilization quantity detected by the utilization quantity detecting section, the number of printed sheets detected by the section for detecting the number of printed sheets and the number of activations counted by the section for counting the number of activations, to the printer management terminal.

14. A program for a terminal, to be executed by the printer management terminal of claim 12, the printer management terminal consisting of a computer, and the program being for executing processing to be realized as:
   status information receiving section for receiving status information including the utilization quantity, the number of printed sheets and the number of activations; and consumption ratio calculating section for calculating the ratio of the consumption quantity to the number of printed sheets based on the status information received by the status information receiving section.

15. A program for a printer, to be executed by the network printer of claim 13; the network printer consisting of a computer, and the program being for executing processing to be realized as:
   utilization quantity detecting section for detecting a utilization quantity of the consumables; section for detecting the number of printed sheets for detecting the number of sheets of printed matter printed by the network printer; section for counting the number of activations for counting the number of activations of the network printer; and status information sending section for sending status information including the utilization quantity detected by the utilization quantity detecting section, the number of printed sheets detected by the section for detecting the number of printed sheets and the number of activations counted by the section for counting the number of activations, to the printer management terminal.

16. A printer management system for communicatively connecting a network printer and a printer management terminal for managing the network printer, and for managing a consumption quantity of consumables used for printing by the network printer;
   the network printer comprising:
      a printing section for performing printing based on received data to be printed;
      a section for detecting the number of printed sheets for detecting the number of sheets of printed matter printed by the network printer;
      a printed data quantity detecting section for detecting the quantity of printed data; and
      a status information sending section for sending status information including the number of printed sheets and the data quantity detected by the printed data quantity detecting section, to the printer management terminal; and
   the printer management terminal comprising:
      a status information receiving section for receiving the status information; and
      a consumption ratio calculating section for calculating the ratio of the consumption quantity to the number of printed sheets based on the status information received by the status information receiving section,
   wherein
   the printer management terminal further comprises a status information storing section for storing the status information;
   the status information receiving section receives the status information and stores the received status information in the status information storing section; and the consumption ratio calculating section calculates an average consumption quantity per print sheet by specifying the total data quantity from a predetermined reference point of time based on the data quantity included in the status information in the status information storing section, estimating the total consumption quantity of the consumables from the predetermined reference point of time from a predetermined arithmetic expression based on the specified total data quantity, specifying the total number of printed sheets from the predetermined reference point of time based on the number of printed sheets included in the status information in the status information storing section, and dividing the total consumption quantity by the total number of printed sheets.

17. A device management method for managing the quantity of consumables consumed by operation of a device, the method comprising:
   a utilization degree obtaining step of obtaining a utilization degree indicating a degree of utilization of the consumables; a generation quantity obtaining step of obtaining the quantity of a product generated by consumption of the consumables; a step of counting the number of activations for counting the number of activations of the device; and a consumption ratio calculating step of calculating the ratio of the consumption quantity to the generation quantity based on the utilization degree obtained at the utilization degree obtaining step, the generation quantity obtained at the generation quantity obtaining step and the number of activations counted at the step of counting the number of activations.

* * * * *